United States Patent [19]

Haase et al.

[11] 3,932,381
[45] Jan. 13, 1976

[54] MAGENTA IMAGE-PROVIDING PHENYLAZO-NAPHTHYL DYES

[75] Inventors: Jan R. Haase; Richard A. Landholm, both of Rochester, N.Y.; James J. Krutak, Sr., Kingsport, Tenn.

[73] Assignee: Eastman Kodak Company, Rochester, N.Y.

[22] Filed: Feb. 5, 1974

[21] Appl. No.: 439,810

Related U.S. Application Data

[63] Continuation-in-part of Ser. No. 331,729, Feb. 12, 1973, abandoned.

[52] U.S. Cl. .................. 260/197; 96/1.2; 96/1.3; 96/1.6; 96/3; 96/29 R; 96/55; 96/66; 260/157; 260/162; 260/196; 260/198; 260/199; 260/200; 260/201; 260/202; 260/456 A; 260/556 A; 260/556 B; 260/556 C; 260/559 S

[51] Int. Cl.² ............... C09B 29/10; C09B 29/20; G03C 5/30; G03C 5/54

[58] Field of Search .......... 260/197, 198, 199, 200, 260/201, 202; 96/3

[56] References Cited
UNITED STATES PATENTS

| | | | |
|---|---|---|---|
| 2,706,684 | 4/1955 | Graham et al. | 260/202 X |
| 3,148,062 | 9/1964 | Whitmore et al. | 96/55 |
| 3,443,939 | 5/1969 | Bloom et al. | 96/3 |
| 3,443,940 | 5/1969 | Bloom et al. | 96/3 |
| 3,459,548 | 8/1969 | Bloom et al. | 96/3 |
| 3,498,785 | 3/1970 | Bloom et al. | 96/3 |
| 3,585,028 | 6/1971 | Stephens | 96/3 |
| 3,628,952 | 12/1971 | Puschel et al. | 96/3 |
| 3,709,693 | 1/1973 | Bloom et al. | 96/118 |
| 3,737,316 | 6/1973 | Salminen et al. | 96/56.6 |
| 3,751,406 | 8/1973 | Bloom | 260/162 |

*Primary Examiner*—Floyd D. Higel
*Assistant Examiner*—John J. Doll
*Attorney, Agent, or Firm*—Elliott Stern; Daniel B. Reece, III

[57] ABSTRACT

Magenta image dye-providing compound having formulas as follows:

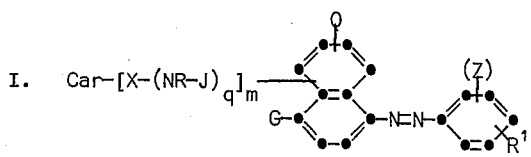

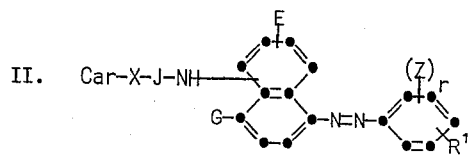

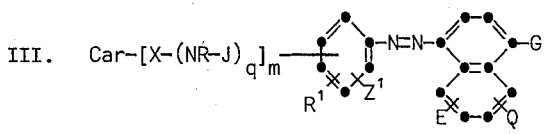

wherein:
Car represents a carrier moiety which, as a function of oxidation under alkaline conditions, releases a diffusible dye from said compound;
$m$ and $q$ each represent an integer having a value of 0 or 1;
X represents a bivalent linking group;
R represents hydrogen or alkyl;
J represents a bivalent radical selected from sulfonyl or carbonyl;
Q represents hydrogen, hydroxy or an acylamino radical;
G represents hydroxy, a salt thereof, or a hydrolyzable acyloxy group;
$r$ represents an integer having a value of 1 or 2;
Z represents cyano, trifluoromethyl, a carboxy, a carboxylic acid ester, nitro in the 2- or 3- position relative to the azo radical, fluorosulfonyl, sulfo, halogen, an alkylsulfonyl radical; a phenylsulfonyl radical, alkylcarbonyl, a sulfamoyl radical; a carbamoyl radical, and, in formulas I or II when $r$ is 1, Z may represent a radical having the formula Car-[X—(NR—J)$_q$]$_m$— wherein Car, X, J, R, $q$ and $m$ are as described previously;
$R^1$ represents hydrogen, an alkyl radical, an alkoxy radical or a halogen atom;
E is in the 5-, 6- or 7- position relative to G and represents hydrogen, carboxy, a carboxylic acid ester, sulfo, a sulfamoyl radical, a carbamoyl radical, alkylsulfonyl radical or a phenylsulfonyl radical;
$Z^1$ represents hydrogen or Z;
with the proviso that there be no more than one sulfo radical and no more than one carboxy radical present in said compound.

20 Claims, No Drawings

MAGENTA IMAGE-PROVIDING PHENYLAZO-NAPHTHYL DYES

This is a continuation-in-part application of U.S. Ser. No. 331,729, filed Feb. 12, 1973, now abandoned.

This invention relates to the art of photography and more particularly, to color diffusion transfer photography employing magenta dye-providing compounds.

Color diffusion transfer processes generally involve the use of a photographic element comprising a support, at least one silver halide emulsion layer and an image dye-providing material which is contained in or contiguous to said layer. The image dye-providing material typically can be thought of as having the structure Car-Col wherein Col is a colorant such as a dye or a dye precursor and Car is an associated carrier or monitoring group which, as a function of alkaline processing, effects a substantial change in the diffusivity of at least the Col portion of the compound.

After exposure, a photographic element as described above is treated with an alkaline processing solution to effect imagewise discrimination in the element. As mentioned previously, the imagewise discrimination is generally brought about by the monitoring or carrier group which, in the presence of the alkaline processing solution, is responsible for a substantial change in the diffusivity of at least the dye portion of the dye-providing material. As is known in the art, the dye-providing material can be initially immobile or initially mobile in the processing solution. Upon alkaline processing of an initially immobile dye-providing material, a mobile dye can be released imagewise or the material can be imagewise rendered soluble and thus mobile. If the material is initially mobile, the processing solution typically renders the material insoluble (and thus immobile) in an imagewise fashion.

It is well known in the art to utilize image dye-providing materials in a photographic element wherein an imagewise exposed element can be contacted with an alkaline processing solution to effect an imagewise difference in mobility of at least a portion of the dye-providing material, i.e., to effect release of a dye or dye precursor, to render said compound insoluble or soluble. It is the particular carrier or monitoring group which determines what form the change in diffusivity (of at least the dye portion of the material) will take. In certain instances, an increase in solubility of a given compound can be accomplished by substantially reducing the molecular weight of the compound; see, for example, the disclosure in Gompf U.S. Pat. No. 3,698,897, issued Oct. 17, 1972, in Fleckenstein et al. allowed U.S. Ser. No. 351,673 which is a continuation-in-part of Ser. No. 282,796, filed Aug. 22, 1972, and now abandoned, entitled PHOTOGRAPHIC SYSTEMS, in Anderson et al. U.S. Pat. No. 3,725,062, filed July 6, 1971, entitled COLOR DIFFUSION TRANSFER PROCESSES. Exemplary of systems wherein the dye-providing compound splits off a dye are those described in Whitmore U.S. Pat. No. 3,227,552, issued Jan. 4, 1966, and Bloom U.S. Pat. No. 3,443,940, issued May 13, 1969, and Canadian Pat. No. 602,607, issued Aug. 2, 1960. Similarly, Yutzy U.S. Pat. No. 2,756,142, issued July 24, 1956, U.S. Pat. No. 2,774,668, issued Dec. 18, 1956, and U.S. Pat. No. 2,983,606, issued May 9, 1961, describe photographic elements wherein a dye-providing compound is rendered immobile in an imagewise fashion.

All of these prior systems have utility; howver, it is desired to provide new compounds which provide dyes having improved properties, such as improved hue, diffusibility, mordantability and the like.

We have found a class of magenta, azo dye-providing compounds well suited for use in color diffusion transfer color elements. The dye-providing compounds, as a function of typical processing under alkaline conditions, provide a magenta-colored substance having a mobility different than that of the compound.

The objects of the present invention are achieved through the use in color diffusion transfer elements of a new class of magneta, azo dye-providing compounds as well as the dyes provided thereby. Typically, these compounds are utilized in a photosensitive element which comprises a support having thereon at least one photosensitive silver halide emulsion, and at least one of said layers having associated therewith a magenta, azo dye-providing compound of this invention.

The compounds of this invention can be represented by the following formulas:

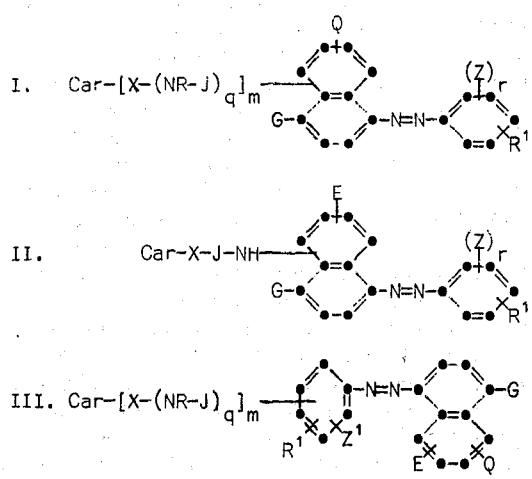

wherein:
Car represents a carrier which is a moiety that, as a function of oxidation under alkaline conditions, provides a substance having a mobility different than that of said compound;

m and q each represent an integer having a value of 0 or 1;

X represents a bivalent linking group of the formula $-R^2-L_n-R^2_p-$ where each $R^2$ can be the same or different and each represents an alkylene radical having 1 to about 8 carbon atoms; a phenylene radical; or a substituted phenylene radical having 6 to about 9 carbon atoms; L represents a bivalent radical selected from oxy, carbonyl, carboxamido, carbamoyl, sulfonamido, sulfamoyl, sulfinyl or sulfonyl; n is an integer having a value of 0 or 1; p is 1 when n equals 1 and p is 1 or 0 when n equals 0 or when q is 0, L is sulfonyl and n is 1, then p is 0, provided that when p is 1 the carbon content of the sum of both $R^2$ radicals does not exceed 14 carbon atoms;

R represents a hydrogen atom, or an alkyl radical having 1 to about 6 carbon atoms;

J represents a bivalent radical selected from sulfonyl or carbonyl;

Q represents a hydrogen atom, a hydroxy radical or a radical having the formula —NHCOR³ or —NHSO₂R³ wherein R³ is an alkyl radical having 1 to about 6 carbon atoms, a substituted alkyl radical having 1 to about 6 carbon atoms, benzyl, phenyl, or a substituted phenyl radical having 6 to about 9 carbon atoms;

G represents a hydroxy radical, a salt thereof, or a hydrolyzable acyloxy group having the formula:

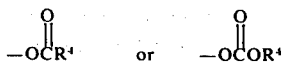

wherein R⁴ is an alkyl radical having 1 to about 18 carbon atoms, phenyl or substituted phenyl having 6 to about 18 carbon atoms;

r represents an integer having a value of 1 or 2;

Z represents a cyano radical, a trifluoromethyl radical, a carboxy radical, a carboxylic acid ester having the formula —COOR⁴ wherein R⁴ is as described previously, a nitro radical in the 2- or 3- position relative to the azo radical, a fluorosulfonyl radical, a sulfo radical, a halogen atom, an alkyl- or substituted alkylsulfonyl radical having 1 to about 8 carbon atoms, a phenyl- or substituted phenylsulfonyl radical having 6 to about 9 carbon atoms, an alkyl carbonyl having 2 to about 5 carbon atoms, a sulfamoyl radical having the formula —SO₂NR⁵R⁶ wherein R⁵ and R⁶ are the same or different and each may represent hydrogen, an alkyl or substituted alkyl radical having 1 to about 6 carbon atoms, a benzyl radical, a phenyl or substituted phenyl radical having 6 to about 9 carbon atoms, alkyl- or substituted alkylcarbonyl having 2 to about 7 carbon atoms, phenyl- or substituted phenylcarbonyl having 7 to about 10 carbon atoms, alkyl- or substituted alkylsulfonyl having 1 to about 6 carbon atoms, phenyl- or substituted phenylsulfonyl having 6 to about 9 carbon atoms, or R⁵ and R⁶ taken together can represent =CH—N(CH₃)₂; a carbamoyl radical having the formula —CON(R⁵)₂ wherein each R⁵ can be the same or different and is as described previously; and, in Formulas I or II where r is 1, Z may represent a radical having the formula Car—[X—(NR-J)$_q$]$_m$— wherein Car, X, J, R, q and m are as described previously;

R¹ represents a hydrogen atom, an alkyl radical having 1 to about 4 carbon atoms, a substituted alkyl radical having 1 to about 4 carbon atoms, an alkoxy radical having 1 to about 4 carbon atoms, or a halogen atom;

E is in the 5-, 6- or 7- position relative to G and represents a hydrogen atom, a carboxy radical, a carboxylic acid ester having the formula —COOR⁴ wherein R⁴ is as described previously, a sulfo radical, a sulfamoyl radical having the formula —SO₂NR⁵R⁶, a carbamoyl radical having the formula —CON(R⁵)₂ wherein R⁵ and R⁶ are as described previously, an alkyl- or substituted alkylsulfonyl radical having 1 to about 8 carbon atoms, or a phenyl- or substituted phenylsulfonyl radical having 6 to about 9 carbon atoms;

Z¹ hydrogen or Z;

with the proviso that there be no more than one sulfo radical and no more than one carboxy radical present in said compound.

As mentioned above, the present compounds contain a carrier moiety (Car—) which, as a function (direct or inverse) of oxidation under alkaline conditions, provides a substance having a mobility different than that of the starting compound. Depending upon the carrier used, the dye-providing compounds of this invention can be of two basic types: (1) initially immobile compounds of which at least a portion is rendered mobile or diffusible as a function of development, or (2) initially mobile or diffusible compounds which are rendered immobile as a function of development. Carriers useful in initially immobile dye-providing compounds such as those wherein the carrier, under alkaline conditions, effects a splitting off of a ballast group from the dye moiety are described further in Whitmore Canadian Pat. No. 602,607, dated Aug. 2, 1960, and Whitmore U.S. Pat. No. 3,227,552, issued Jan. 4, 1966, both incorporated herein by reference. Among the preferred initially immobile compounds are those in which the carrier, as a function of oxidation under alkaline conditions, releases a dye having a mobility different than that of the starting immobile compound. For example, useful carriers for compounds in which the carrier moiety undergoes intramolecular ring closure upon oxidation to split off a dye are described in U.S. Pat. Nos. 3,443,939, 3,443,940 and 3,443,941, all issued May 13, 1969, and all incorporated herein by reference. Special initially immobile carriers useful in forming a diffusible substance as an inverse function of oxidation are described in copending Hinshaw and Condit application Ser. No. 326,628, filed Jan. 26, 1973, and now abandoned, and entitled "Positive-Working Immobile Photographic Compounds and Photographic Elements Containing Same," incorporated herein by reference. Improved initially immobile dye-providing compounds which undergo redox reactions followed by alkali cleavage of the carrier to split off a dye are disclosed in Fleckenstein et al. allowed U.S. Ser. No. 351,673 which is a continuation-in-part of Serial No. 282,796, filed Aug. 22, 1972, now abandoned, entitled "Photographic Systems," incorporated herein by reference. The ballasted phenolic and naphtholic carriers of Fleckenstein et al are among preferred carrier moieties. Still other useful carriers are described in U.S. Pat. No. 3,628,952, issued Dec. 21, 1971. Additionally, carriers useful in the formation of initially mobile compounds such as those wherein the carrier functions as a developer are described in Friedman U.S. Pat. No. 2,543,691, issued Feb. 27, 1951; U.S. Pat. No. 2,983,606, issued May 8, 1961; and U.S. Pat. 3,255,001, issued June 7, 1966; all incorporated herein by reference. Carriers of this latter type include various hydroquinone moieties.

Examples of bivalent alkylene linking groups representative of R² are —CH₂—, —C₂H₄—, —C₆H₁₂—, —C₃H₆—, —C₄H₈—, etc., as well as branched alkylene radicals such as

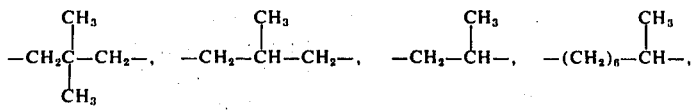

a phenyl- or substituted phenylsulfonyl radical having 6 to about 9 carbon atoms;

etc.

References hereinafter to o, m and p mean that either the ortho, meta or para radicals are indicated, as the case may be.

Examples of phenylene and substituted phenylene radicals representative of $R^2$ are o,m,p-phenylene, o,m,p-phenylene substituted with chloro, methoxy, butoxy, bromo, cyano, nitro, methyl, ethyl, carboxy, sulfo, amino, etc.

As used herein the oxygen- or sulfur-containing bivalent radicals representative of L are oxy (—O—), carbonyl (—CO—), carboxamido (—CONH—), carbamoyl (—NHCO—), sulfonamido (—$SO_2$NH—), sulfamoyl (—NH$SO_2$—) sulfinyl (—SO—) and sulfonyl (—$SO_2$—). Therefore, non-limiting examples of bivalent linking groups which may be represented by X are —$CH_2$—O—$CH_2$—,

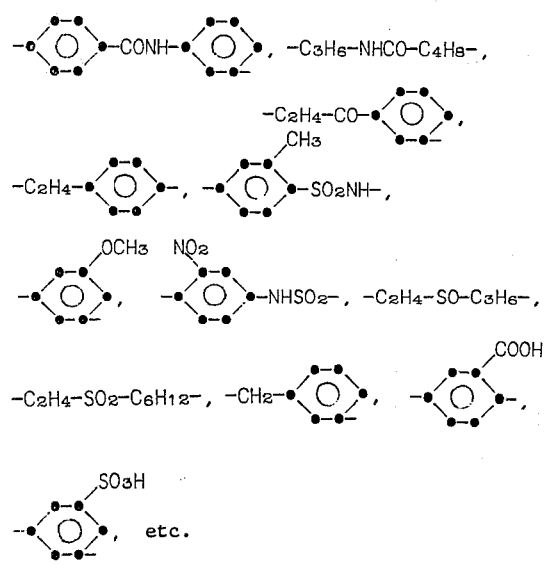

Examples of the groups which R may represent are hydrogen, methyl, ethyl, isopropyl, pentyl, hexyl, etc. The alkyl group represented by R may additionally be substituted with cyano, hydroxy, methoxy, etc.

Examples of groups representative of Q are a hydrogen atom, a hydroxy radical or a radical having the formula —NHCO$R^3$ or —NH$SO_2R^3$ wherein $R^3$ is as described previously such as —NHCO$CH_3$, —NHCO$C_2H_5$, —NHCO$C_6H_{13}$, —NHCO$C_2H_4$CN, —NHCO$C_3H_6SO_2NH_2$, —NHCO$CH_2C_6H_5$, —NHCO$C_6H_4$COOH, —NH$SO_2CH_3$, —NH$SO_2C_6H_4$CN, —NH$SO_2C_6H_4$Cl, —NH$SO_2C_2H_5$, —NHCO$C_3H_6SO_3H$, —NH$SO_2C_6H_4OCH_3$, etc.

Examples of the groups which G may represent are hydroxy, salts thereof such as alkali metal (e.g., —O$^⊖$Li$^⊕$, —O$^⊖$K$^⊕$, —O$^⊖$Na$^⊕$) salts and photographically inactive ammonium salts thereof such as —O$^{⊖⊕}NH_4$, —O$^{⊖⊕}NH(CH_3)_3$, —O$^{⊖⊕}N(C_2H_5)_4$,

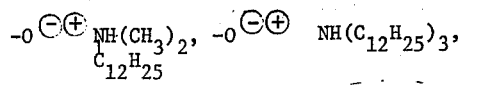

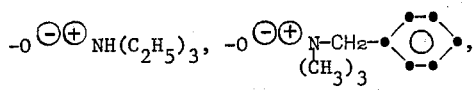

or tetralkyl ammonium salt (sometimes called "amine salts") which does not adversely affect the photographic utility of the magenta image dye-providing compound or the physical or chemical processes which occur during development of the image.

G may also advantageously represent a hydrolyzable acyloxy group having the formula

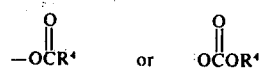

wherein $R^4$ is as described previously. Non-limiting examples of these hydrolyzable groups are

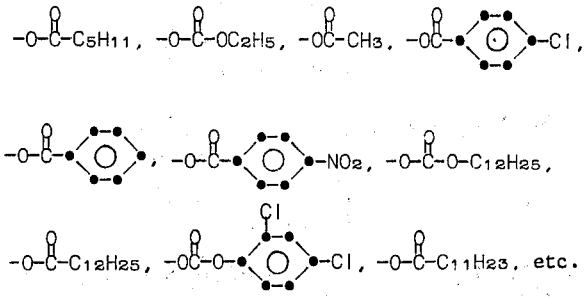

Examples of the groups which Z and $Z^1$ may represent are a cyano radical (—CN), a carboxylic acid ester such as —COO$CH_3$, —COO$C_{11}H_{23}$, —COO$C_2H_5$, —COO$C_6H_5$,

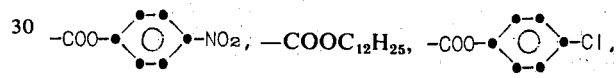

etc.; a carboxy radical including salts thereof, such as alkali metal salts or photographically inactive ammonium salts (e.g., —COOH, —COO$^-$Li$^+$, —COO$^-$K$^+$, —COO$^-$Na$^+$, —COO$^-NH_4^+$, etc.), a nitro radical (—$NO_2$) in the 2- or 3- position relative to the azo linkage, a fluorosulfonyl radical (—$SO_2$F), a sulfo radical including salts thereof, such as alkali metal or photographically inactive ammonium salts (e.g., —$SO_3$H, —$SO_3^-$Li$^+$, $SO_3^-$K$^+$, —$SO_3^-$Na$^+$, —$SO_3^-NH_4^+$, etc.); a halogen atom such as chloro, fluoro or bromo; —$SO_2CH_3$, —$SO_2C_2H_5$,

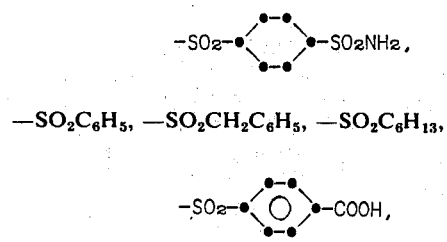

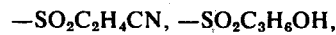

—$SO_2C_2H_4$CN, —$SO_2C_3H_6$OH,

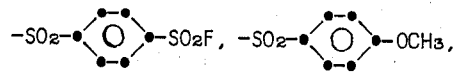

etc.; —CO$CH_3$, —CO$C_3H_7$, —CO$CH_2C_6H_5$, —CO$C_5H_{11}$, —$SO_2NH_2$, —$SO_2$NH$CH_3$, —$SO_2$NH$C_2H_5$, —$SO_2N(CH_3)_2$, —$SO_2$NH$CH_2C_6H_5$,

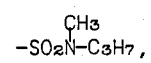

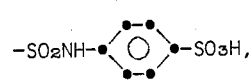

—SO₂NHC₂H₄CN, —SO₂NHCOC₆H₅, —SO₂NHCOCH₃, —SO₂NHCOC₃H₇,

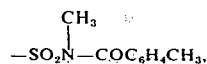

—SO₂NHCOCH₂C₆H₅, —SO₂NHC₂H₄SO₃H,

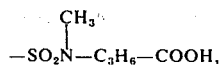

—SO₂NHSO₂CH₃,

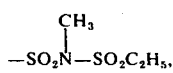

—SO₂NHSO₂C₆H₅, —SO₂N=CH—N(CH₃)₂, etc.; —CONH₂, —CON(C₂H₅)₂,

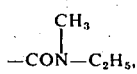

—CONHCH₃, —CONHC₅H₁₁ etc.

Examples of the groups which R¹ may represent are hydrogen, —CH₃, —C₂H₅, —C₃H₇, —C₄H₉, isopropyl, methoxy, ethoxy, butoxy, isopropoxy, chloro, bromo, fluoro, etc.

Examples of the groups which E may represent are hydrogen, a carboxylic acid ester such as —COOCH₃, —COOC₁₁H₂₃, —COOC₂H₅, —COOC₆H₅,

—COOC₁₂H₂₅,

etc.; a carboxy radical including salts thereof, such as alkali metal salts or photographically inactive ammonium salts (e.g., —COOH, —COO⁻Li⁺, —COO⁻K⁺, —COO⁻Na⁺, —COO⁻NH₄⁺, etc.)., —SO₂NH₂, —SO₂NHCH₃, —SO₂NHC₂H₅, —SO₂N(CH₃)₂, —SO₂NHCH₂C₆H₅,

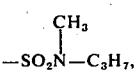

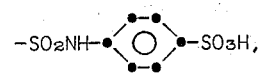

—SO₂NHC₂H₄CN, —SO₂NHCOC₆H₅, —SO₂NHCOCH₃, —SO₂NHCOC₃H₇,

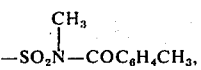

—SO₂NHCOCH₂C₆H₅, —SO₂NHC₂H₄SO₃H,

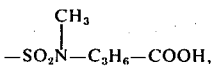

etc.; —CONH₂, —CON(C₂H₅)₂,

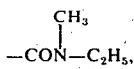

—CONHCH₃, —CONHC₅H₁₁, etc.; —SO₂CH₃, —SO₂C₂H₅,

—SO₂C₆H₁₃, —SO₂C₂H₄CN, —SO₂C₆H₅, —SO₂CH₂C₆H₅,

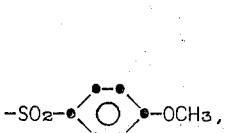

—SO₂C₂H₄OH,

—SO₂(CH₂)₃SO₂NH₂, —SO₂(CH₂)₃SO₃H, etc., —CONH₂, —CON(C₂H₅)₂,

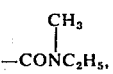

—CONHCH₃, —CONHC₆H₅, etc.

Preferred compounds are those having Formulas I, II and III above wherein:

the Car—[X—(NR—J)$_q$]$_m$— substituent in Formula I is in the 5- or 6- position relative to G;

the Car-X-J-NH- substituent in Formula II is in the 5- or 8- position relative to G;

the Car-[X—(NR-J)$_q$]$_m$— substituent in Formula III is in the 2-, 3- or 4- position relative to the azo linkage;

Car is a moiety which, as a function of oxidation under alkaline conditions, releases a dye having a mobility different than said compound;

R² represents an alkylene radical having 1 to about 4 carbon atoms, phenylene or phenylene substituted with carboxy, chloro, methyl or methoxy;

L represents sulfamoyl, sulfonamido, carbamoyl or carboxamido;

R represents hydrogen;

$q$ is an integer having a value of 1;

$m$ is an integer having a value of 0 or 1;

Q represents hydrogen, hydroxy, —NHCOR³ or —NHSO₂R³ wherein R³ represents an alkyl radical having 1 to about 4 carbon atoms; an alkyl radical having 1 to about 4 carbon atoms substituted with hydroxy, cyano, sulfamoyl, carboxy or sulfo; benzyl, phenyl or phenyl substituted with carboxy, chloro, methyl, methoxy or sulfamoyl;

G represents a hydroxy radical or a hydrolyzable acyloxy group having the formula:

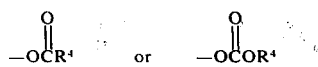

wherein R⁴ is an alkyl radical having 1 to about 18 carbon atoms, phenyl or substituted phenyl having 6 to about 18 carbon atoms;
  r is an integer having a value of 1;
  Z represents cyano, trifluoromethyl, chloro, fluoro, bromo, alkylsulfonyl having 1 to about 6 carbon atoms, alkylsulfonyl having 1 to about 6 carbon atoms substituted with hydroxy, phenyl, cyano, sulfamoyl, carboxy, fluorosulfonyl or sulfo; phenylsulfonyl; phenylsulfonyl substituted with hydroxy, sulfamoyl, fluorosulfonyl, carboxy or sulfo; sulfamoyl radical having the formula —SO₂NHR⁶ wherein R⁶ is hydrogen, an alkyl radical having 1 to about 4 carbon atoms, or an alkyl radical having 1 to about 4 carbon atoms substituted with hydroxy, cyano, sulfamoyl, carboxy or sulfo; benzyl, phenyl or phenyl substituted with hydroxy, sulfonyl, sulfamoyl, carboxy or sulfo;
  R¹ represents hydrogen, an alkyl radical having 1 to about 4 carbon atoms, an alkoxy radical having 1 to about 4 carbon atoms, chloro, bromo or fluoro;
  E represents hydrogen or a sulfamoyl radical of the formula —SO₂NHR⁶ wherein R⁶ is hydrogen; an alkyl radical of 1 to about 4 carbon atoms; an alkyl radical having 1 to about 6 carbon atoms substituted with hydroxy, cyano, sulfamoyl, carboxy, or sulfo; benzyl, phenyl or phenyl substituted with hydroxy, sulfamoyl, carboxy or sulfo; and
  Z¹ represents hydrogen, methylsulfonyl, cyano or sulfamoyl.
Especially preferred magenta image dye-providing compounds are those having the formula

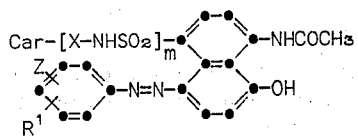

wherein
  X represents

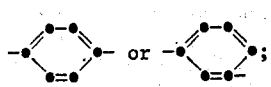

Z represents cyano, a sulfamoyl radical having the formula —SO₂NHR⁶ wherein R⁶ is an alkyl radical having 1 to about 4 carbon atoms; or an alkylsulfonyl radical having 1 to about 4 carbon atoms; and
  R¹ represents hydrogen or chloro.
Of the above compounds those wherein X represents

Z represents cyano, —SO₂NHCH₃ or —SO₂CH₃; and R¹ represents hydrogen or chloro are the even more preferred.

Other especially preferred magenta image dye-providing compounds are those having the formula

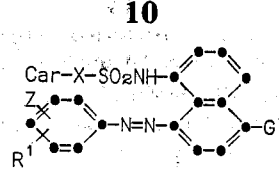

wherein
  X represents

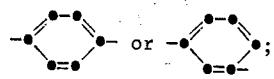

G represents hydroxy, a photographically inactive ammonium salt thereof, or a hydrolyzable acyloxy group having the formula:

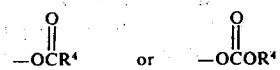

wherein R⁴ is an alkyl radical having 1 to about 18 carbon atoms, phenyl or phenyl substituted with chloro or nitro;
  Z represents cyano, a sulfamoyl radical having the formula —SO₂NHR⁶ wherein R⁶ is an alkyl radical having 1 to about 4 carbon atoms; or an alkylsulfonyl radical having 1 to about 4 carbon atoms; and
  R¹ represents hydrogen or chloro.
Of the above compounds those wherein X represents

G represents a hydroxy radical; Z represents cyano, —SO₂NHCH₃ or —SO₂CH₃, and R¹ represents hydrogen or chloro are the even more preferred.

Still another group of especially preferred magenta image dye-providing compounds having the formula

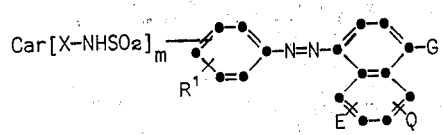

wherein
  Q is in the 5-position relative to G and represents hydrogen or —NHSO₂R³, or Q is in the 8-position relative to G and represents —NHCOCH₃;
  G represents hydroxy, a photographically inactive ammonium salt thereof, or a hydrolyzable acyloxy group having the formula:

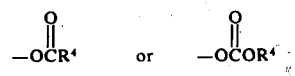

wherein R⁴ is an alkyl radical having 1 to about 18 carbon atoms, phenyl or phenyl substituted with chloro or nitro;
  R¹ represents hydrogen or chloro; and
  E represents hydrogen or, when Q is —NHCOCH₃, E is in the 5-position relative to G and represents —SO₂NH₂.
Of the above compounds those wherein Q represents hydrogen, —NHSO₂CH₃ or —NHCOCH₃ and G represents hydroxy are the most preferred.

Even more especially preferred compounds are those having Formulas I, II and III above wherein Car- represents a radical of the formula:

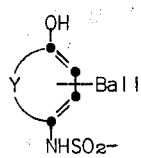

IV.

wherein Ball represents an organic ballasting group of such size and configuration as to render the compound nondiffusible during development in the alkaline processing composition and Y represents the carbon atoms necessary to complete a benzene or naphthalene nucleus including substituted benzene or naphthalene. When Y represents the atom necesssary to complete a naphthalene nucleus, Ball can be attached to either ring thereof. Preferred ballasting groups are those wherein —Ball represents

or —$SO_2NH$-Ball. Examples of some preferred carriers are as follows:

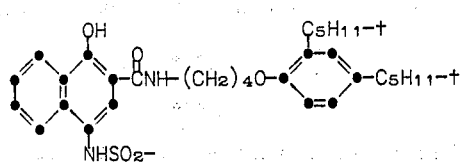

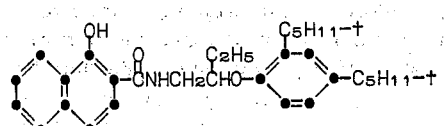

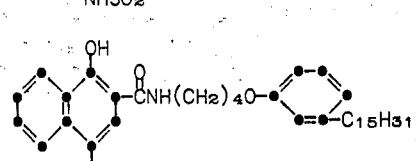

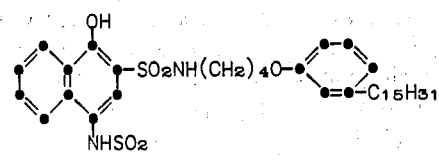

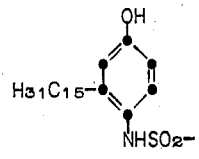

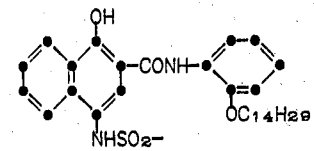

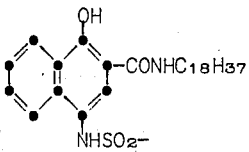

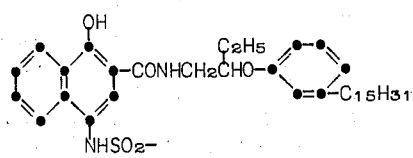

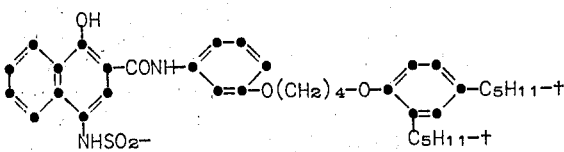

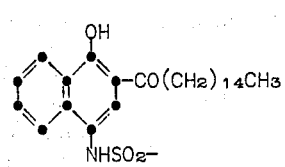

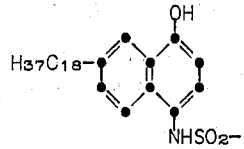

The nature of the ballast group (Ball) in the Formula IV for the compounds described above is not critical as long as it confers nondiffusibility to the compounds. Typical ballast groups include long straight or branched chain alkyl radicals linked directly or indirectly to the compound as well as aromatic radicals of the benzene and naphthalene series indirectly attached or fused directly to the benzene nucleus, etc. Useful ballast groups generally have at least 8 carbon atoms such as a substituted or unsubstituted alkyl group of 8 to 22 carbon atoms, an amide radical having 8 to 30 carbon atoms, a keto radical having 8 to 30 carbon atoms, etc., and may even comprise a polymer backbone. Especially preferred compounds are those wherein the ballast is attached to the benzene nucleus through a carbamoyl radical (—NHCO—) or a sulfamoyl radical (—$SO_2NH$—) in which the nitrogen is adjacent the ballast group.

In addition to the ballast, the benzene nucleus in the above formula may have groups or atoms attached thereto such as the halogens, alkyl, aryl, alkoxy, aryloxy, nitro, amino, alkylamino, arylamino, amido, cyano, alkylmercapto, keto, carboalkoxy, heterocyclic groups, etc.

In a preferred embodiment of this invention CAR is a moiety which as a function of oxidation under alkaline conditions, releases a dye having a mobility different than that of the image dye-providing compounds.

The preferred novel dyes which are released from the carrier moieties as a function of oxidation under alkaline conditions may be represented by the following formulas:

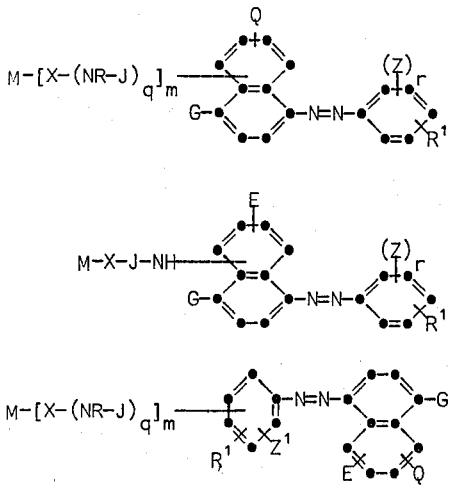

V.

VI.

VII.

wherein
wherein $m$ represents $NH_2SO_2-$, $HSO_2-$ or lower alkyl—NH—; and

X, R, J, q, m, Q, G, Z, $Z^1$, $R^1$ and E are as described previously, except that the Car substituents described for Z are replaced by M. The preferred released dyes, of course, correspond to the above mentioned preferred image dye-providing compounds set forth above.

When M represents $-SO_2H$, the dyes thus represented may be released by the reactions described in Bloom, U.S. Pat. No. 3,443,940, in Puschel, U.S. Pat. No. 3,628,952 and Gompf, U.S. Pat. No. 3,698,897. When M represents lower alkyl-NH— (i.e., an alkyl group having 1 to about 4 carbon atoms), the dyes thus represented may be released by the reactions described in Hinshaw et al., U.S. Ser. No. 326,628. The especially preferred released dyes of our invention are those represented by Formulas V, VI and VII above when M represents $-SO_2NH_2$. These dyes may be released by the reactions described in Fleckenstein et al., U.S. Ser. No. 282,796 from the carrier moieties described by Formula IV.

A suitable process for producing a photographic transfer image in color using the compounds of our invention, for example those wherein Car is as shown in Formula IV, comprises the steps of:

1. treating the above-described photosensitive element with an alkaline processing composition in the presence of a silver halide developing agent to effect development of each of the exposed silver halide emulsion layers, thereby oxidizing the developing agent and the oxidized developing agent in turn cross-oxidizing the sulfonamido compound;

2. forming an imagewise distribution of diffusible released dye as a function of the imagewise exposure of each of the silver halide emulsion layers by cleaving each cross-oxidized sulfonamido compound; and 3. diffusing to a dye image-receiving layer at least a portion of each of the imagewise distributions of diffusible released dye to provide an image.

The photosensitive element in the above-described process can be treated with an alkaline processing composition to effect or initiate development in any manner. A preferred method for applying processing composition is by use of a rupturable container or pod which contains the composition. In general, the processing composition employed in our system contains the developing agent for development, although the composition could also just be an alkaline solution where the developer is incorporated in the photosensitive element, in which case the alkaline solution serves to activate the incorporated developer.

A photographic film unit according to our invention which is adapted to be processed by passing the unit between a pair of juxtaposed pressure-applying members, comprises:

1. a photosensitive element as described above;
2. a dye image-receiving layer; and
3. means for discharging an alkaline processing composition within the film unit such as a rupturable container which is adapted to be positioned during processing of the film unit so that a compressive force applied to the container by the pressure-applying members will effect a discharge of the contents of the container within the film unit;

the film unit containing a silver halide developing agent.

The dye image-receiving layer in the above-described film unit can be located on a separate support adapted to be superposed on the photosensitive element after exposure thereof. Such image-receiving elements are generally disclosed, for example, in U.S. Pat. No. 3,362,819. When the means for discharging the processing composition is a rupturable container, typically it is positioned in relation to the photosensitive element and the image-receiving element so that a compressive force applied to the container by pressure-applying members, such as found in a camera designed for in-camera processing, will effect a discharge of the contents of the container between the image-receiving element and the outermost layer of the photosensitive element. After processing, the dye image-receiving element is separated from the photosensitive element.

The dye image-receiving layer in the above-described film unit can also be located integral with the photosensitive silver halide emulsion layer. One useful format for integral receiver-negative photosensitive elements is disclosed in Belgian Pat. No. 757,960. In such an embodiment, the support for the photosensitive element is transparent and is coated with an image-receiving layer, a substantially opaque light reflective layer, e.g., $TiO_2$, and then the photosensitive layer of layers described above. After exposure of the photosensitive element, a rupturable container containing an alkaline processing composition and an opaque process sheet are brought into superposed position. Pressure-applying members in the camera rupture the container and spread processing composition over the photosensitive element as the film unit is withdrawn from the camera. The processing composition develops each exposed silver halide emulsion layer and dye images are formed as a function of development which diffuse to the image-receiving layer to provide a position, right-reading image which is viewed through the transparent support on the opaque reflecting layer background.

Another format for integral negative-receiver photosensitive elements in which the present invention can be employed is disclosed in Belgian Pat. No. 757,959.

In this embodiment, the support for the photosensitive element is transparent and is coated with the image-receiving layer, a substantially opaque, light-reflective layer and the photosensitive layer or layers described above. A rupturable container containing an alkaline processing composition and an opacifier is positioned adjacent to the top layer and a transparent top sheet. The film unit is placed in a camera, exposed through the transparent to sheet and then passed through a pair of pressure-applying members in the camera as it is being removed therefrom. The pressure-applying members rupture the container and spread processing composition and opacifier over the negative portion of the film unit to render it light insensitive. The processing composition develops each silver halide layer and dye images are formed as a result of development which diffuse to the image-receiving layer to provide a right-reading image that is viewed through the transparent support on the opaque reflecting layer background.

Still other useful integral formats in which our sulfonamido compounds can be employed are described in U.S. Pat. Nos. 3,415,644; 3,415,645; 3,415,646; 3,647,437; and 3,635,707.

The film unit or assembly of the present invention can be used to produce positive images in single or multicolors. In a three-color system, each silver halide emulsion layer of the film assembly will have associated therewith an image dye-providing material possessing a predominant spectral absorption within the region of the visible spectrum to which said silver halide emulsion is sensitive, i.e., the blue-sensitive silver halide emulsion layer will have a yellow image dye-providing material associated therewith, the green-sensitive silver halide emulsion layer will have a magenta image dye-providing material associated therewith, and the red-sensitive silver halide emulsion layer will have a cyan image dye-providing material associated therewith. The image dye-providing material associated with each silver halide emulsion layer can be contained either in the silver halide emulsion layer itself or in a layer contiguous to the silver halide emulsion layer. The magenta image dye-providing material will, or course, be a compound of this invention.

When G is a hydrolyzable acyloxy group, the absorption spectrum of the azo dye is shifted to shorter wavelength. "Shifted dyes" of this type absorb light outside the range to which the associated silver halide layer is sensitive. The use of certain related shifted azo dye developers is described in U.S. Pat. No. 3,307,947 issued Mar. 7, 1967. The shifted dye-providing materials of this invention can be advantageously contained in the silver halide emulsion layer without substantially reducing the sensitivity of the layer. The acyloxy group is hydrolyzed by the alkaline processing composition, releasing the cyan dye of the desired hue. The yellow and cyan image dy-providing materials can be selected from a variety of materials such as those compounds described by Fleckenstein et al U.S. Ser. No. 282,796, mentioned previously. Additional useful cyan image dye-providing materials are described in co-filed Haase et al application Ser. No. 439,789, entitled "Novel Compounds and Photographic Materials."

The concentration of the compounds, which preferably are alkalicleavable upon oxidation, that are employed in the present invention can be varied over a wide range depending upon the particular compound employed and the results which are desired. For example, the image dye-providing compounds of the present invention can be coated in layers as dispersions in a hydrophilic film-forming natural or synthetic polymer, such as gelatin, polyvinyl alcohol, etc., which is adapted to be permeated by aqueous alkaline processing composition. Preferably, the ratio of dye-providing compound to polymer will be about 0.25 to about 4.0. The present compounds may then be incorporated in a gelatin by techniques known in the art (e.g., a high boiling, water immiscible organic solvent or a low boiling or water miscible organic solvent).

Depending upon which Car is used on the present compounds, a variety of silver halide developing agents can be employed in our invention. If the carrier used is that of Formula IV, any silver halide developing agent can be used as long as it cross-oxidizes with the image dye-providing compounds used herein. The developer can be employed in the photosensitive element to be activated by the alkaline processing composition. Specific examples of developers which can be employed in our invention include hydroquinone, aminophenols, e.g., N-methylaminophenol, Phenidone (1-phenyl-3-pyrazolidone) trademark of Ilford, Ltd.; Dimezone (1-phenyl-4,4-dimethyl-3-pyrazolidone) trademark of Eastman Kodak Company; 1-phenyl-4-methyl-4-hydroxymethyl-3-pyrazolidone, N,N-diethyl-p-phenylenediamine, 3-methyl-N,N-diethyl-p-phenylenediamine, 3-methoxy-N,N-diethyl-p-phenylenediamine, etc. The black-and-white developers in this list are preferred, in that they have a reduced propensity of staining the dye image-receiving layer.

In a preferred embodiment of our invention, the silver halide developer in our process becomes oxidized upon development and reduces silver halide to silver metal. The oxidized developer then cross-oxidizes the sulfonamido-phenol or sulfonamido-naphthol dye-releasing compound. The product of cross-oxidation then undergoes alkaline hydrolysis, thus releasing an imagewise distribution of diffusible anionic dye which then diffuses to the receiving layer to provide the dye image. The diffusible moiety is transferable in alkaline processing composition either by virtue of its self-diffusivity or by having attached to it one or more solubilizing groups such as $-COOH$, $-SO_3H$, $-SO_2NR^5R^6$, OH, etc. (where $R^5$ and $R^6$ are as described previously with at least one being hydrogen).

In using the especially preferred dye-releasing compounds according to our invention, the production of diffusible dye images is a function of development of the silver halide emulsions with a silver halide developing agent to form either negative or direct positive silver images in the emulsion layers. If the silver halide emulsion employed forms a direct positive silver image, such as a direct positive internal-image emulsion or a solarizing emulsion, which develops in unexposed areas, a positive image can be obtained on the dye image-receiving layer. After exposure of the film unit, the alkaline processing composition permeates the various layers to initiate development in the unexposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction in a preferred embodiment of our invention, to release the preformed dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit lowers the pH of the film unit (or the image-receiving unit) to stabilize the image.

Internal-image silver halide emulsions useful in those embodiments wherein a dye is released as a function of oxidation are direct-positive emulsions that form latent images predominantly inside the silver halide grains, as distinguished from silver halide grains that form latent images predominantly on the surface thereof. Such internal-image emulsions are described by Davey et al. in U.S. Pat. No. 2,592,250, issued Apr. 8, 1952, and elsewhere in the literature. Other useful emulsions are described in U.S. Pat. No. 3,761,276, dated Sept. 25, 1973. Internal-image silver halide emulsions can be defined in terms of the increased maximum density obtained when developed with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20°C. in Developer A below ("internal-type" developer), have a maximum density at least five times the maximum density obtained when an equally exposed silver halide emulsion is developed for 4 minutes at 20°C. in Developer B described below ("surface-type" developer). Preferably, the maximum density in Developer A is at least 0.5 density unit greater than the maximum density in Developer B.

DEVELOPER A

| | |
|---|---|
| Hydroquinone | 15 g. |
| Monomethyl-p-aminophenol sulfate | 15 g. |
| Sodium sulfite (desiccated) | 50 g. |
| Potassium bromide | 10 g. |
| Sodium hydroxide | 25 g. |
| Sodium thiosulfate | 20 g. |
| Water to make one liter. | |

DEVELOPER B

| | |
|---|---|
| P-hydroxyphenylglycine | 10 g. |
| Sodium carbonate | 100 g. |
| Water to make one liter. | |

The internal-image silver halide emulsions when processed in the presence of fogging or nucleating agents provide direct positive silver images. Such emulsions are particularly useful in the abovedescribed embodiment. Suitable fogging agents include the hydrazines disclosed in Ives U.S. Pat. Nos. 2,588,982 issued Mar. 11, 1952, and 2,563,785 issued Aug. 7, 1951; the hydrazides and hydrazones disclosed in Whitmore U.S. Pat. No. 3,227,552 issued Jan. 4, 1966; hydrazone quaternary salts described in Lincoln and Heseltine U.S. Pat. No. 3,615,615 issued Oct. 26, 1971; hydrazone containing polymethine dyes described in Spence and Janssen U.S. Pat. NO. 3,718,470 issued Feb. 27, 1973; or mixtures thereof. The quantity of fogging agent employed can be widely varied depending upon the results desired. Generally, the concentration of fogging agent is from about 0.4 to about 8 grams per mole of silver in the photosensitive layer in the photosensitive element or from about 0.1 to about 2 grams per liter of developer if it is located in the developer. The fogging agents described in U.S. Pat. Nos. 3,615,615 and 3,718,470, however, are preferably used in concentrations of about 0.5 to 10.0 grams per mole of silver in the photosensitive layer.

The solarizing direct-positive silver halide emulsions useful in the above-described embodiment are well-known silver halide emulsions which have been effectively fogged either chemically, such as by the use of reducing agents, or by radiation to a point which corresponds approximately to the maximum density of the reversal curve as shown by Mees, *The Theory of the Photographic Process*, published by the Macmillan Co., New York, New York, 1942, pages 261–297. Typical methods for the preparation of solarizing emulsions are shown by Groves British Pat. No. 443,245, Feb. 25, 1936, who subjected emulsions to Roentgen rays "until an emulsion layer formed therefrom, when developed without preliminary exposure, is blackened up to the apex of its graduation curve"; Szaz British Pat. NO. 462,730, Mar. 15, 1937, the use of either light or chemicals such as silver nitrate, to convert ordinary silver halide emulsions to solarizing direct positive emulsions; and Arens U.S. Pat. No. 2,005,837, June 25, 1935, the use of silver nitrate and other compounds in conjunction with heat to effect solarization. Particularly useful are the fogged direct-positive emulsions of Berriman U.S. Pat. No. 3,367,778; Illingsworth U.S. Pat. Nos. 3,501,305, 3,501,306 and 3,501,307; and combinations thereof.

Other embodiments in which our imaging chemistry can be employed include the techniques described in U.S. Pat. Nos. 3,227,550, 3,227,551, 3,227,552 and 3,364,022.

If photographic elements are used which contain compounds of this invention wherein Car is a silver halide developer as described, for example, in U.S. Pat. No. 2,983,606, when the liquid processing composition is applied, it permeates the emulsion to provide a solution of the dye developer substantially uniformly distributed in the emulsion. As the exposed silver halide emulsion is developed to a negative silver image, the oxidation product of the dye developer is immobilized or precipitated in situ with the developed silver, thereby providing an imagewise distribution of unoxidized dye developer dissolved in the liquid processing composition. This immobilization is apparently due, at least in part, to a change in the solubility characteristics of the dye developer upon oxidation. At least part of this imagewise distribution of unoxidized dye-developer is transferred to a superposed image-receiving layer to provide a transfer image.

Negative silver halide emulsions useful in certain embodiments of this invention, such as the above, can comprise, for example, silver chloride, silver bromide, silver chlorobromide, silver bromoiodide, silver chlorobromoiodide or mixtures thereof. The emulsions can be coarse- or fine-grain and can be prepared by any of the well-known procedures, e.g., single-jet emulsions such as those described in Trivelli and Smith, *The Photographic Journal*, Vol. LXXIX, May, 1939 (pp. 330–338), double-jet emulsions, such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 16, 1967; and Jones U.S. Pat. No. 3,574,628 issued Apr. 13, 1971. The emulsions may be monodispersed regular-grain emulsions such as the type described in Klein and Moisar, *J. Phot. Sci.*, Vol. 12, No. 5, Sept./Oct., 1964 (pp. 242-251).

Another embodiment of our invention uses the image-reversing technique disclosed in British Pat. No. 904,364, page 19, lines 1-41. In this system our dye-providing compounds are used in combination with physical development nuclei in a nuclei layer contiguous to the photosensitive silver halide negative emulsion layer. The film unit contains a silver halide solvent, preferably in a rupturable container with the alkaline processing composition.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectivity sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181; 2,643,886; 2,653,732; 2,724,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color film unit according to this invention, each silver halide emulsion layer containing a dye image-providing material or having the dye image-providing material present in a contiguous layer may be separated from the other silver halide emulsion layers in the imageforming portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011; and 3,427,158.

Generally speaking, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described in Minsk U.S. Pat. No. 2,882,156, issued Apr. 14, 1959, and basic polymeric mordants such as described in Cohen et al U.S. Pat. No. 3,625,694, issued Dec. 7, 1971; U.S. Pat. No. 3,709,690, issued Jan. 9, 1973; and U.S. Application Ser. No. 400,778, filed Sept. 26, 1973, now U.S. Pat. NO. 3,898,088. See also U.S. Application Ser. No. 412,992 of Burness et al., filed Nov. 5, 1973, and now U.S. Pat. NO. 3,859,096.

Preferred mordants are cationic mordants such as polymeric compounds composed of a polymer having quaternary nitrogen groups and at least two aromatic nuclei for each quaternary nitrogen in the polymer cation (i.e., having at least two aromatic nuclei for each positively charged nitrogen atom), such polymeric compounds being substantially free of carboxy groups. Useful mordants of this type are comprised of units of the following formula in copolymerized relationship with units of at least one other ethylenically unsaturated monomer:

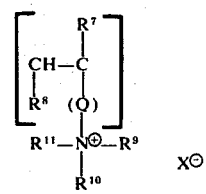

wherein $R^7$ and $R^8$ each represent a hydrogen atom or a lower alkyl radical (of 1 to about 6 carbon atoms) and $R^8$ can additionally be a group containing at least one aromatic nucleus (e.g., phenyl, naphthyl, tolyl); Q can be a divalent alkylene radical (of 1 to about 6 carbon atoms), a divalent arylene radical, a divalent aralkylene radical, a divalent arylenealkylene radical, such as

a

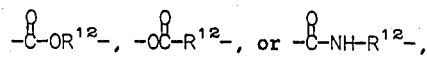

wherein $R^{12}$ is an alkylene radical, or $R^8$ can be taken together with Q to form a

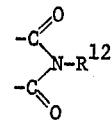

group; $R^9$, $R^{10}$ and $R^{11}$ can be alkyl, aralkyl or aryl, or $R^9$ and $R^{10}$ and the nitrogen atom to which they are attached can together with Q represent the atoms and bonds necessary to form a quaternized nitrogen-containing heterocyclic ring, and $X^-$ is a monovalent negative salt-forming radical or atom in ionic relationship with the positive salt-forming radical, wherein said polymer is substantially free of carboxy groups and wherein the positive salt forming radical of said polymer comprises at least two aryl groups for each quaternary nitrogen atom in said polymer. In one preferred embodiment, Q represents a phenylene or substituted phenylene radical and $R^9$, $R^{10}$ and $R^{11}$ are the same or different and represent alkyl groups, the sum of their carbon atoms exceeding 12. These preferred polymeric cationic mordants are described further in the above-mentioned U.S. Pat. No. 3,709,690 and U.S. Application Ser. No. 400,778, incorporated herein by reference.

Other mordants useful in our invention include poly-4-vinylpyridine, the 2-vinyl pyridine polymer methyl-p-toluene sulfonate and similar compounds described in Sprague et al U.S. Pat. No. 2,484,430, issued Oct. 11, 1949, and cetyl trimethylammonium bromide, etc. Effective mordanting compositions are also described in Whitmore U.S. Pat. No. 3,271,148 and Bush U.S. Pat. No. 3,271,147, both issued Sept. 6, 1966.

Generally, good results are obtained when the image-receiving layer, preferably alkaline solution-permeable, is transparent and about 0.25 to about 0.40 mil in thickness. This thickness, of course, can be modified depending upon the result desired. The image-receiving layer can also contain ultraviolet absorbing materials to protect the mordanted dye images from fading due to ultraviolet light, brightening agents such as the stilbenes, coumarins, triazines, oxazoles, dye stabilizers such as the chromanols, alkylphenols, etc.

Use of a pH-lowering material in the dye image-receiving element of a film unit according to the invention will usually increase the stability of the transferred image. Generally, the pH-lowering material will effect a reduction in the pH of the image layer from about 13 or 14 to at least 11 and preferably 4–8 within a short time after imbibition. For example, polymeric acids as disclosed in U.S. Pat. No. 3,362,819, or solid acids or metallic salts, e.g., zinc acetate, zinc sulfate, magnesium acetate, etc., as disclosed in U.S. Pat. No. 2,584,030 may be employed with good results. Such pH-lowering materials reduce the pH of the film unit after development to terminate development and substantially reduce further dye transfer and thus stabilize the dye image.

An inert timing or spacer layer can be employed in the practice of our invention over the pH-lowering layer which "times" or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer may be effective in evening out the various reaction rates over a wide range of temperatures, e.g., premature pH reduction is prevented when imbibition is effected at temperatures above room temperature, for example, at 95°–100°F. The timing layer is usually about 0.1 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material, e.g., sodium hydroxide, sodium carbonate or an amine such as diethylamine, preferably possessing a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cp. to about 200,000 cp. In certain embodiments of our invention, an opacifying agent, e.g., $TiO_2$, carbon black, pH indicator dyes, etc., may be added to the processing composition.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge.

The alkaline solution-permeable, substantially opaque, light-reflective layer employed in certain embodiments of photographic film units of our invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layer, dark-colored opacifying agents, e.g., carbon black, nigrosine dyes, etc., may be added to it, or coated in a separate layer adjacent to the light-reflective layer.

The supports for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethylene-terephthalate) film, polycarbonate film, poly-α-olefins such as polyethylene and polypropylene film, and related films or resinous materials. The support can be from about 2 to about 9 mils in thickness.

The silver halide emulsions useful in our invention are well knonw to those skilled in the art and are described in *Product Licensing Index*, Vol. 92, December, 1971, publication 9232, p. 107, paragraph I, "Emulsion types"; they may be chemically and spectrally sensitized as described on page 107, paragraph III, "Chemical sensitization," and pp. 108–109, paragraph XV, "Spectral sensitization," of the above article; they can be protected against the production of fog and can be stabilized against loss of sensitivity during keeping by employing the materials described on p. 107, paragraph V, "Antifoggants and stabilizers," of the above article; they can contain development modifiers, hardeners, and coating aids as described on pp. 107–108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants," and paragraph VII, " Vehicles," and p. 109, paragraph XVI, "Absorbing and filter dyes," of the above article; they and other layers in the photographic elements used in this invention may contain addenda which are incorporated by using the procedures described on p. 109, paragraph XVII, "Methods of addition," of the above article; and they can be coated by using the various techniques described on p. 109, paragraph XVIII, "Coating procedures," of the above article, the disclosures of which are hereby incorporated by reference.

It will be appreciated that there remains in the photographic element after transfer has taken place an imagewise distribution of dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. The imagewise distribution of dye may also diffuse out of the element into these baths, if desired, rather than to an image-receiving element. If a negative-working silver halide emulsion is employed in such photosensitive element, then a positive color image, such as a color transparency or motion-picture film, may be produced in this manner. If a direct-positive silver halide emulsion is employed in such photosensitive element, then a negative color image may be produced.

Preferably, when the desired dye image is retained in the image-forming unit, the image dye-providing materials are shifted (G is hydrolyzable acyloxy) and are incorporated in the silver halide emulsion layer. Improved processes are described in U.S. Ser. No. 422,390, filed Dec. 6, 1973.

The following examples are provided for a further understanding of the invention. The structures of all of the compounds were confirmed by their infrared and NMR spectra and in some cases by elemental analysis. The notation $C_5H_{11}$-t as used herein is an abbreviation for t-pentyl.

4-Amino-N-[4-(2,4-di-t-pentylphenoxy)-butyl]-1-hydroxy-2-naphthamide may be prepared as follows: 1-hydroxy-N-[4-(2,4-di-t-pentylphenoxy)-butyl]-2-napthamide (U.S. Pat. No. 2,474,293) is coupled with a diazotized p-anisidine (e.g.

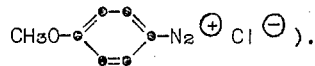

).

The azo group of the compound thus prepared may then be reduced with sodium dithionite ($Na_2S_2O_4$) to the corresponding amine (see also U.S. Pat. No. 3,458,315, column 10).

EXAMPLE 1

Preparation of Compound No. 1

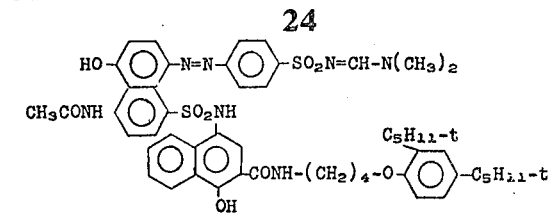

To 90 ml. of dry pyridine, under nitrogen, at 0°C. was added 2.95 g (0.06 mol) of 4-amino-N-[4-(2,4-di-tert-pentylphenoxy)butyl]-1-hydroxy-2-naphthamide. To this solution 2.9 g. (0.06 mol) of 4-acetamido-8-[5-N-(dimethylaminomethylene)sulfamoylphenylazo]-5-hydroxy-1-naphthalenesulfonyl chloride was added. The reaction mixture was stirred at room temperature for ninety minutes and then poured into a mixture of ice and concentrated hydrochloric acid. The resulting solid was collected on a filter funnel and dried to yield 5.8 g. (>100%). It was purified by chromatography using a silica column, with ethyl acetate being used to elute the product. The yield was 30%, m.p. 237°C.

PREPARATION OF INTERMEDIATES: The sulfonyl chloride compound above was prepared from the sodium salt of the corresponding sulfonic acid compound by adding 3.0 g. (0.01 mol) of N,N-dimethylformamide to a slurry of 4.85 g. (0.01 mol) of sodium 4-acetamido-5-hydroxy-6-(4-sulfamoylphenylazo)-1-naphthalenesulfonate in 600 ml. of thionyl chloride. The mixture was stirred for 90 minutes at room temperature and filtered. The filtrate was poured onto ice, the solid collected on a filter funnel and dried to yield 1.3 g. (24%), m.p. 140°C. The sodium salt of the dye above was obtained as follows: 300 ml. of 1N hydrochloric acid was added to a solution of 17.2 g. (0.1 mol) of sulfanilamide in 100 ml. of 1N sodium hydroxide. The solution was cooled to 0°C and a solution of 6.9 g. (0.1 mol) of sodium nitrite in 80 ml. of water was added at <3°C. This mixture was then added to a solution of 8-acetamido-1-acetoxy-5-naphthalenesulfonic acid, pyridine salt in 300 ml. of 1N sodium hydroxide at <3°C. The reaction mixture was stirred for one hour, solid collected on a filter funnel and dried to yield 35.2 g. (72%), m.p. 7300°C. The pyridine salt above was obtained by the acetylation of "S acid" in acetic anhydride and pyridine at 80°C.

EXAMPLE 2

Preparation of Compound No. 2

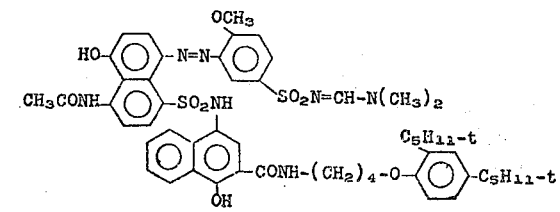

This compound was prepared in a manner similar to that used in Example 1. The yield was 20%, m.p. 163°–6°C. The 4-acetamido-8-[5-(N-dimethylaminomethylene)sulfamoyl-2-methoxyphenylazo]-5-hydroxy-1-naphthalenesulfonyl chloride was prepared in a manner similar to that used in Example 1.

EXAMPLE 3

Preparation of Compound No. 3

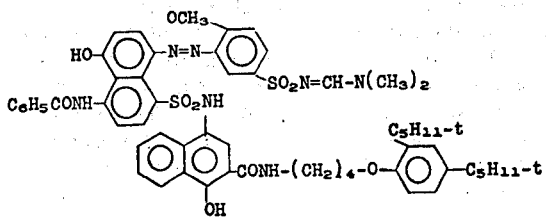

The method used in Example 1 was utilized to prepare this compound. The yield was 26%, m.p. 168°–72°C dec. The 4-benzamido-8-[5-N-(dimethylaminomethylene)sulfamoyl-2-methoxyphenylazo]-5-hydroxy-1-naphthalenesulfonyl chloride was prepared by the method used for Example 1 in 68% yield. Sodium 4-benzamido-5-hydroxy-8-(2-methoxy-5-sulfamoylphenylazo)-1-naphthalenesulfonate was also prepared similarly to Example 1 in 35% yield.

EXAMPLE 4

Preparation of Compound No. 4

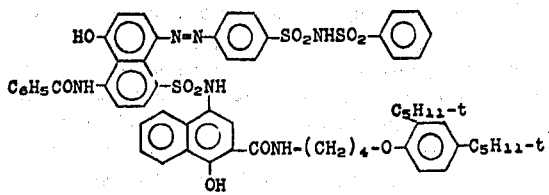

The method used for Example 1 was used to prepare this compound. The yield was 15%, m.p. 155°–60°C dec. The sulfonyl chloride was prepared from 1.0 g. (.0014 mol.) of 4-benzamido-8-[4-(N-benzenesulfonylsulfamoyl)phenylazo]-5-hydroxy-1-naphthalenesulfonic acid, sodium salt which was stirred overnight in 25 ml. of chlorobenzene containing 0.8 g. of phosphorous pentachloride. The solid was collected on a filter funnel and dried to yield 1.0 g. (100%). The sodium 4-benzamido-8-[4-(benzenesulfonylsulfamoyl)phenylazo]-5-hydroxy-1-naphthalene sulfonate was prepared in a manner similar to Example 1 in 15% yield.

EXAMPLE 5

Preparation of Compound No. 5

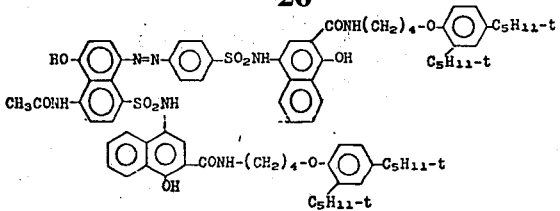

To a solution of 1.95 g. (.004 mol) of 4-amino-N-[4-(2,4-di-tert-pentylphenoxy)butyl]-1-hydroxy-2-naphthamide in 50 ml. of dry pyridine at 0°C, under nitrogen, was added 1.95 g. (.004 mol) of 4-acetamido-8-(4-chlorosulfonylphenylazo)-5-hydroxy-1-naphthalenesulfonyl chloride. The solution was stirred at 0°C for 1 hour, poured into 75 ml. of concentrated hydrochloric acid and 75 ml. of ice. The solid was collected on a filter funnel and dried. It was then chromatographed on a silica column, eluting with ethyl acetate to remove the product. The eluents were concentrated to dryness and the resulting solid reprecipitated from chloroform with hexane. The solid was collected on a filter funnel and dried to yield 1.1 g. (39.%), m.p. 220°–2°C dec. The 4-acetamido-8-(4-chlorosulfonylphenylazo)-5-hydroxy-1-naphthalenesulfonyl chloride was prepared by heating a solution of 9.7 g. (.02 mol) of sodium 4-acetamido-5-hydroxy-6-(4-sulfamoylphenylazo)-1-naphthalenesulfonate in 150 ml. of chlorosulfonic acid on a steam bath for ninety minutes. The solution was cooled and poured onto ice. The solid was collected on a filter funnel an dried to yield 9.4 g. (94%). The sodium 4-acetamido-5-hydroxy-8-(4-sulfamoylphenylazo)-1-naphthalenesulfonate was prepared as in Example 1.

EXAMPLE 6

Preparation of Compound No. 6

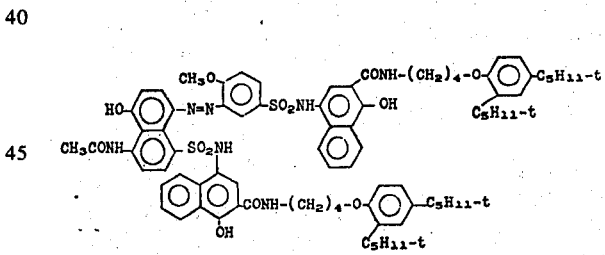

This compound was prepared in a manner similar to that used for Example 5. The yield was 74%, m.p. 138°–42°C. The 4-acetamido-8-(5-chlorosulfonyl-2-methoxyphenylazo)-5-hydroxy-1-naphthalenesulfonyl chloride was prepared according to the method of Example 5. The sodium 4-acetamido-5-hydroxy-8-(5-sulfamoyl-2-methoxyphenylazo)-1-naphthalenesulfonate was prepared in a manner similar to that used in Example 1.

EXAMPLE 7

Preparation of Compound No. 7

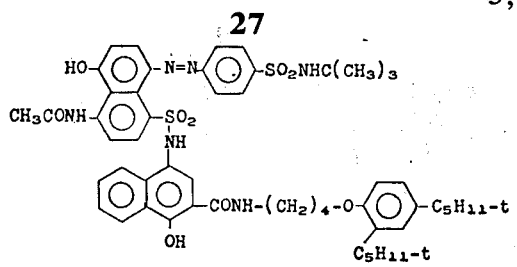

The method shown for Example 1 was also used to prepare this example in 40% yield, m.p. 169°–72°C dec. The 4-acetamido-8-[4-(N-t-butyl)sulfamoylphenylazo]-5-hydroxy-1-naphthalenesulfonyl chloride was prepared, in 89% yield, similarly to Example 1. Sodium 4-acetamido-8-[4-(N-t-butyl)sulfamoylphenylazo]-5-hydroxy-1-naphthalenesulfonic acid was prepared in a manner similar to Example 1. The yield was 39%.

EXAMPLE 8

Preparation of Compound No. 8

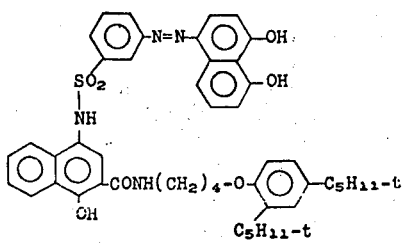

To a solution of 2.50 g. (3.8 mmol) of 4-m-aminobenzenesulfonamido-N-[4-(2,4-di-tert-pentylphenoxy)butyl]-1-hydroxy-2-naphthamide in 20 ml. of trifluoroacetic acid (under nitrogen) in an ice-methanol bath was added a cold solution of 0.28 g. (4 mmol) of sodium nitrite in 3 ml. of water. The green-yellow diazonium solution, which formed immediately, was poured into a stirred solution (under nitrogen) of 0.62 g. (3.8 mmol) of 1,8-dihydroxynaphthalene in 10 ml. pyridine and 50 ml. mixed acid (1:5 propionic/acetic acids). The magenta-colored mixture was stirred at 0° for 45 minutes and then poured into 600 g. of ice water. The crude product was filtered, washed with water, and dried. It weighed 3.32 g. The crude material was recrystallized once from a mixture of tetrahydrofuran, methanol, and water and again from ethyl acetate/hexane to give 2.35 g. m.p. 232°–234°C.

EXAMPLE 9

Preparation of Compound No. 9

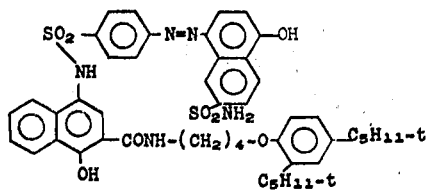

To a solution of 1.3 g. (2.0 mmol) of 4-p-aminobenzenesulfonamido-N-[4-(2,4-di-tert-pentylphenoxy)-butyl]-1-hydroxy-2-naphthamide in 10 ml. of trifluoroacetic acid (under nitrogen) was added a cold solution of 0.14 g. (2 mmol) of sodium nitrite in 1 ml. of water. The deep brown-green diazonium solution thus formed was poured into a solution of 1-naphthol-6-sulfonamide in 9 ml. pyridine/45 ml. of 1:5 propionic/acetic acid. Because coupling occurred rather slowly, the red-orange solution was stirred 1.5 hours and then poured into 400 g. of ice water. The resulting orange solid was filtered, washed with water and air dried. The crude product was recrystallized from ethanol/tetrahydrofuran/hexane and again from tetrahydrofuran/hexane to give 1.07 g. (61%) of magenta dye, m.p. 164°–166°C.

EXAMPLE 10

Preparation of Compound No. 10

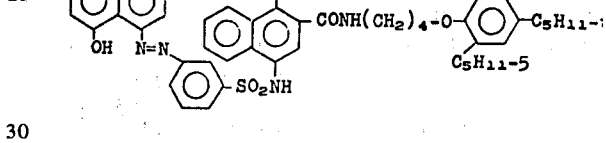

A solution of 6.45 g. (10 mmol) 4-m-aminobenzenesulfonamido-N-[4-(2,4-di-t-pentylphenoxy)-butyl]-1-hydroxy-2-naphthamide in 100 ml. tetrahydrofuran was cooled to 3°C and treated dropwise with 1.2 g. of isopentyl nitrite. The mixture was stirred one-half hour and then poured slowly into a cold solution of 1.6 g. (10 mmol) of 1,5-naphthalenediol in 250 ml. of 20% solution of propionic acid in acetic acid followed by 10 drops of pyridine. The mixture was left in the refrigerator overnight, filtered, and diluted with water to give a tar, which was solidified by heating in glacial acetic acid followed by cooling. The solid was filtered off, washed with water and air dried. On standing an additional product precipitated from the supernatant, yielding a total of 6.5 g. (80%). The product was recrystallized from acetic acid to give 2.8 g. of orange powder, m.p. 232°–5°.

EXAMPLE 11

Prepartion of Compound No. 11

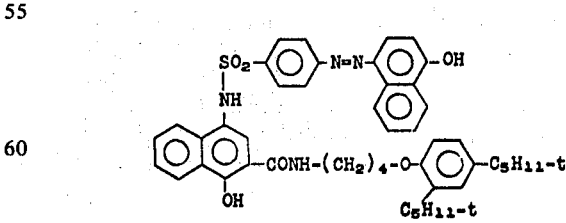

A solution of 0.65 g. (1 mmol) of 4-m-aminobenzenesulfonamido-N-]4-(2,4-di-t-pentylphenoxy)-butyl]-1-hydroxy-2-naphthamide and 0.14 ml. of isopentyl nitrite in 10 ml of tetrahydrofuran was added to a solution of 0.175 g. (1 mmol) of 1-naphthol in 25 ml.

of a 5:1 mixture of acetic acid and propionic acid at 0°C. The reaction mixture was stirred for one hour during which time a red solid precipitated. The solid was collected and washed with aqueous acetic acid. This provided 0.6 g. of pure product in 72% yield, m.p. 212°–215°.

EXAMPLE 12

Photographic Testing

The dye-releasing redox (DRR) compounds were tested for reactivity and diffusibility of their released dyes to a receiving element. Each DRR compound was dissolved in an equal weight of diethyllauramide and finely dispersed in gelatin. The dispersion was added to a 0.8 μm monodispersed negative-working gelatino-silver bromide emulsion which was coated on a polyester film support, the coverage of DRR being about 1.1 $\times 10^{-5}$ moles/dm$^2$; silver - 9.2 mg/dm$^2$; and gelatin - 32 mg/dm$^2$. An overcoat layer of 8.6 g/dm$^2$ of gelatin, hardened by formaldehyde was then applied.

A. Image discrimination — A sample of the above coating was exposed through a step-wedge and then laminated to a mordant-containing receiving element with a viscous processing composition (goo) by passing the "sandwich" between a pair of juxtaposed pressure-applying rollers. The receiving element consisted of a paper support on which was coated a mixture of gelatin (21 mg/dm$^2$) and a mordant, poly[styrene-co-N-benzyl-N,N-dimethyl-N-(3-maleimidopropyl)ammonium chloride] (21 mg/dm$^2$). The goo contained per liter of solution: 20 g. sodium hydroxide, 0.75 g. 4-hydroxymethyl-4-methyl-1-phenyl-3-pyrazolidone, 10 g. potassium bromide, and 25 g. hydroxyethylcellulose. After 60 seconds, the receiver was peeled apart and washed in water to adjust the pH to about 7. Good image density in the exposed areas was obtained with practically no transfer of dye in the unexposed areas. The Dmax and Dmin for each transfer is given under image discrimination in the table.

B. Spectrophotometry - The spectra of the released dyes when adsorbed to the mordant on a transparent support were measured spectrophotometrically. The maximum wavelength (λ max) and the bandwidth in nm at one-half the density at the λ max of the curve for each dye is also given in the table. This "half band width" along with the λ max is indicative of hue, the brightness and purity of color being greater, the smaller the half band width.

C. Dye-transfer in receiving element - Another sample of an emulsion coating containing the DRR compound was fogged by exposure to light and processed by passing it as a "sandwich" with an image receiving element and viscous developing composition (goo) between a pair of juxtaposed pressure-applying rollers. The developer layer thickness of the resulting laminate ranged from about 0.075 to 0.10 mm. The receiving element had the following structure (the coverages in mg/dm$^2$ are shown in parenthesis):

Carbon (27) + Gelatin (17)
TiO$_2$ (215) + Gelatin (21)
Mordant* (21) + Gelatin (11)
Cellulose acetate support

*same as above

The "goo" contained 20 g. sodium hydroxide, 0.75 g. 4-hydroxymethyl-4-methyl-1-phenyl-3-pyrazolidone, 10 g. potassium bromide and 25 g. hydroxyethylcellulose, all per liter of solution. Upon application of the goo to the fogged emulsion layer, the dyes are released and diffuse through the carbon and titania layers to the mordant layer. The density of the dyes on the mordant layer was read through the support by means of a reflection densitometer after intervals of 30, 60 and 120 seconds at 24°C. The increase in density as indicated by the values in the table, is a measure of the rate of release and also of the diffusivity of the dyes.

Table 1

PHOTOGRAPHIC PROPERTIES

| Compound of Example | λ max (nm) | Half-band width (nm) | Image Discrimination | | | Density of Dye Transfer Image after | | |
|---|---|---|---|---|---|---|---|---|
| | | | Coverage (moles × 10$^{-6}$ per dm$^2$) | Dmax | Dmin | Coverage (moles × 10$^{-6}$ per dm$^2$) | 30 sec | 60 sec | 120 sec |
| 1 | 540 | 110 | 6 | 1.30 | 0.24 | 11 | 1.72 | 2.40 | 2.70 |
| 2 | 530 | 111 | 11 | 2.65 | 0.58 | 11 | 1.60 | 2.34 | 2.34 |
| 3 | 540 | 114 | 11 | 2.40 | 0.45 | 11 | 0.75 | 1.63 | 2.15 |
| 4 | 535 | 105 | 11 | 1.80 | 0.85 | 6 | 0.33 | 0.82 | 1.48 |
| 5 | 540 | 108 | 11 | 2.70 | 0.20 | 8 | 0.64 | 1.30 | 1.99 |
| 6 | 530 | 117 | 11 | 2.04 | 0.30 | 11 | 0.75 | 1.50 | 2.05 |
| 7 | 544 | 108 | 6 | 1.86 | 0.48 | 6 | 0.62 | 0.98 | 1.41 |
| 8 | 545 | 112 | 11 | 2.12 | 0.38 | 11 | 0.64 | 0.95 | 1.24 |
| 9 | 538 | 105 | 6 | 1.81 | 0.96 | 6 | 0.81 | 1.29 | 1.69 |
| 10 | 570 | 100 | 11 | 2.11 | 0.60 | 11 | 0.73 | 1.05 | 1.35 |
| 11 | 542 | 121 | 11 | 1.56 | 0.58 | 11 | 0.59 | 0.93 | 1.48 |

EXAMPLE 13

Preparation of Compound No. 12

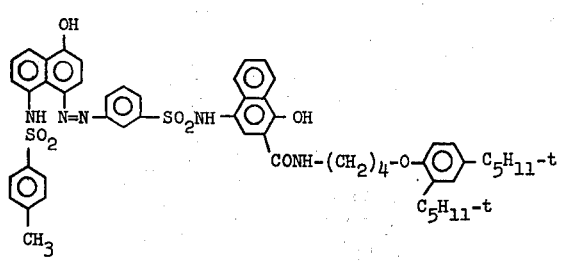

A solution of 1 mole 5-amino-1-naphthol in dry pyridine was stirred at 0°C and treated portionwise with 1 mole of p-toluenesulfonyl chloride. When analysis showed that the 5-amino-1-naphthol was consumed the reaction mixture was poured onto a sufficient quantity of aqueous hydrogen chloride to neutralize the excess pyridine and allow separation of the product as a fine powder which was filtered, washed with water, and recrystallized from ethanol to obtain (96% yield) analytically pure 5-p-toluenesulfonamido-1-naphthol having a melting point of 182°–194°C. Next, 2.58 g. (4.00 mmol) of 4-(m-aminophenylsulfonamido)-N-[4-(2,4-di-tert-pentylphenoxy)butyl]-1-hydroxy-2-naphthamide were dissolved in 10 ml. dry pyridine and treated with 50 ml. 5:1 acid and 10 ml. concentrated hydrochloric acid. The clear solution was cooled to 0°C. and treated with a solution of 284 mg. (4.00 mmol) sodium nitrite in 3 ml. of ice water. The resulting orange solution was added rapidly to a solution of 1.25 g. (4.00 mmol) of the above sulfonamidonaphthol dissolved in 8 ml. dry pyridine and 50 ml. 5:1 acid, and cooled to 5°C. The orange dye formed immediately. After 40 minutes at 5°–10°, the dye was precipitated by adding 300 ml. ice water and adjusting the pH to 2 with concentrated HCl. The orange powder obtained by filtration was washed with 8 liters of water and dried to give 3.31 g. Compound 12. This compound was tested in a manner similar to that of Example 12A and the released dye was found to have a λ max of 555 nm. The Dmax of transferred image was 0.97.

EXAMPLE 14

Preparation of Compound No. 13

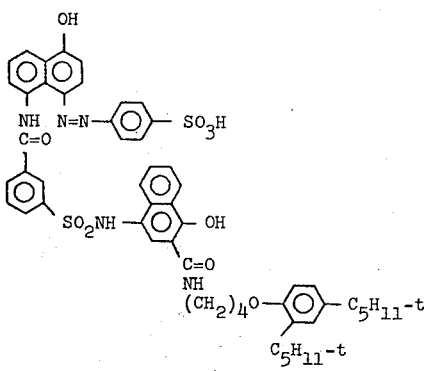

A solution of 8.1 g. (.05 mmol) 5-amino-1-naphthol, 6.1 g. (.05 mmol) N,N-dimethylaniline, and in 100 ml. tetrahydrofuran was added dropwise at −10°–0°C to a solution of 12.1 g. (0.05 mmol) m-chlorosulfonylbenzoyl chloride in tetrahydrofuran (200 ml.). The addition required 1 hour. The reaction was nearly complete after the addition but was stirred at −10°C for 2 hours, treated with 0.05 mole of Compound A, 4-amino-N-[-4-(2,4-di-tert-pentylphenoxy)butyl]-1-hydroxy-2-naphthamide, and .05 mole pyridine, and stirred at 25°C until Compound A had reacted. The reaction mixture was poured into 2 liters of water and the dark oil which separated induced to crystallize by adding 200 ml. 10% hydrogen chloride solution. The crude product was filtered, washed with water, and air dried to give 42.96 g. of crude product (102% yield). Recrystallization from 500 ml. boiling benzene gave, after filtration and a slow recrystallization 39 g. of product 2 (92%) having m.p. 214°–219°C with satisfactory IR and NMR analyses. Next, a solution of 8.28 g. (.01 mol) Compound 2 in 4.0 g. 50% sodium hydroxide solution and 50 ml. water was added at 0° to a solution of diazotized sulfanilic acid (.01 mol) prepared in the usual manner at 0°C. Coupling at 0°C was conducted for 1 hour at pH 10 by proper adjustment of the pH with sodium carbonate solution. The red solution was acidified with 10% hydrogen chloride solution, filtered, and washed thoroughly with cold water. The crude dye-providing compound weighed 9.24 g. (92%) when dried and was purified sufficiently for image transfer testing by repeated trituration from boiling acetonitrile. After washing thoroughly with cold acetonitrile and diethyl ether, it was thoroughly vacuum dried. The resultant Compound 13 was tested as in Example 12A and the transferred magenta dye image was found to have a Dmax of about 2.2.

EXAMPLE 15

Preparation of Compound No. 14

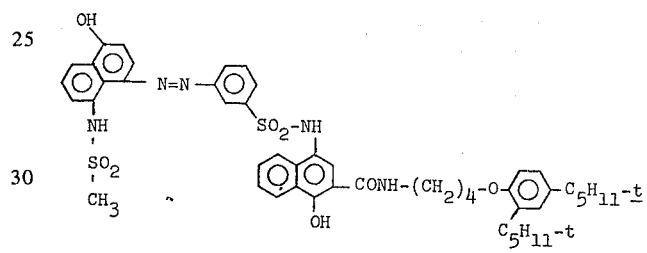

10.3 g. (.025 mol) of N-[5-hydroxy-8-(m-fluorosulfonylphenylazo-1-naphthyl]methanesulfonamide was added to 8.0 g. (0.095 mol) of sodium bicarbonate and 12.2 g. (.025 mol) of 4-amino-N-[4-(2,4-di-tert-pentylphenoxy)butyl]-1-hydroxy-2-naphthamide in 80 ml. of dimethylsulfoxide, under nitrogen. The mixture was heated on a steam bath for ninety minutes and poured into 1 liter of ice water containing 25 ml. of concentrated hydrochloric acid. The solid was collected on a filter funnel and dried. After one slurry in 400 ml. of hot toluene and one slurry in 100 ml. of acetic acid, the yield of dye was 12.0 g. (55%). PREPARATION OF INTERMEDIATES: A cooled solution of 2.0 g. (0.29 mol) of sodium nitrite in 12 ml. of water was added portionwise, at <5°C to a solution of 6.05 g. (.029 mol) of 3-aminobenzenesulfonyl fluoride in 50 ml. of 10% hydrochloric acid. This solution was added at 10°C to a cooled solution of 6.08 g. (.026 mol) of N-(5-hydroxy-1-naphthyl)methanesulfonamide in 75 ml. of a mixture of 1 part by volume propionic acid to 5 parts acetic acid and 18 ml. of pyridine. The final solution was stirred at <10°C for 90 minutes and poured into 1 liter of ice water. The pH of the aqueous solution was adjusted to 2, the solid collected on a filter funnel and dried to yield 10.3 g. (93%). For the preparation of the above sulfonamide, 20.0 g. (.125 mol) of 5-amino-1-naphthol was dissolved in 63 ml. of acetone containing 10 ml. (.13 mol) of pyridine. To this mixture 16.0 g. (.14 mol) of methanesulfonyl chloride was added dropwise. The temperature gradually rose to 55°C and solution was effected. The solution was stirred for 45 minutes and poured into 650 ml. of water containing 15 g. (.375 mol) of sodium hydroxide. The temperature rose to 60°C. The solution was cooled, and acidified with concentrated hydrochloric acid. The solid was collected on a filter funnel, washed with water, and dried to yield 25.7 g. (87%), m.p. 143°–7°C. Compound No. 14 was tested as in Example 12C and found to have transferred dye image densities of 1.86, 2.3 and 2.4 after 30, 60 and 120 seconds, respectively.

EXAMPLE 16

Dyes such as those released from the previously discussed carriers (Car-) during alkaline processing were prepared and dissolved in 30 ml. of a 0.5N sodium hydroxide solution containing 30 g/l of hydroxyethylcellulose. Each solution was spread between a cellulose acetate cover sheet and a receiving element so that the alkaline dye composition was 0.1 mm thick. The receiving element was as described in Example 12 only having an additional layer of gelatin (43 mg/dm²) coated over the carbon-gelatin layer. The spectra of the dyes when adsorbed to the mordant were determined as in Example 12. The following Table II shows the general formula of the dyes tested and the results obtained.

Table II

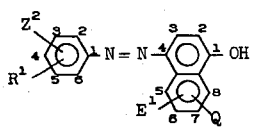

| $Z^2$ | $R^1$ | $E^1$ | Q | λ½ (nm) |
|---|---|---|---|---|
| 4-SO$_2$NH$_2$ | H | 5-SO$_2$NH$_2$ | 8-NHCOCH$_3$ | 531 |
| 3-SO$_2$NH$_2$ | H | " | " | 522 |
| 4-SO$_2$NH$_2$ | 2-Cl | " | " | 543 |
| 3-SO$_2$NH$_2$ | 6-Cl | " | " | 528 |
| 3-SO$_2$NH$_2$ | 4-Cl | " | " | 526 |
| 3-SO$_2$NH$_2$ | 6-OCH$_3$ | " | " | 519 |
| 2-SO$_2$NH$_2$ | H | " | " | 510 |
| 2-SO$_2$NHCH$_3$ | H | " | " | 538 |
| 4-SO$_2$NH(COCH$_3$) | H | " | " | 542 |
| 4-SO$_2$NH(CH$_3$) | H | " | " | 540 |
| 2-SO$_2$CH$_3$ | H | " | " | 540 |
| 4-CN | H | " | " | 550 |
| 2-CN | H | " | " | 549 |
| 2-CF$_3$ | H | " | " | 524 |
| 2-Cl | H | " | " | 520 |
| 4-SO$_2$Na | H | H | 5-NHCOCH$_3$ | 555 |
| 4-SO$_2$NH$_2$ | H | H | 5-OH | 571 |
| 3-SO$_2$NH$_2$ | H | H | " | 560 |
| 3-SO$_2$NH$_2$ | 6-Cl | H | " | 570 |
| 3-SO$_2$NH$_2$ | H | H | 8-OH | 532 |
| 4-SO$_2$NH$_2$ | H | H | 5-NHSO$_2$CH$_3$ | 563 |
| 3-SO$_2$NH$_2$ | H | H | " | 552 |
| 4-SO$_2$NH$_2$ | H | 3-SO$_2$NH$_2$ | H | 518 |
| 3-SO$_2$NH$_2$ | H | 6-SO$_3$Na | 8-NHCOCH$_3$ | 533 |
| 4-SO$_2$NH$_2$ | H | 5-SO$_3$Na | " | 540 |
| 3-SO$_2$NH$_2$ | H | 3-SO$_2$NH$_2$ | " | 520 |
| 4-SO$_2$NH$_2$ | 2-Cl | 3-SO$_3$Na | 8-NHCOCH$_3$ | 535 |
| 4-SO$_2$NH$_2$ | 2-Cl | 3-SO$_3$Na | 5-NHCOCH$_3$ | 530 |
| 3-SO$_2$NH$_2$ | H | H | 8-NHSO$_2$CH$_3$ | 517 |
| 4-SO$_2$NH$_2$ | H | 5–SO$_2$NH–C$_6$H$_4$–SO$_2$NH$_2$ | 8-NHCOCH$_3$ | 533 |
| 4-SO$_2$H | H | H | H | 541 |
| 2-SO$_2$CH$_3$ | H | 6-SO$_2$NH$_2$ | H | 576 |
| 4-SO$_2$CH$_3$ | H | 6-SO$_2$NH$_2$ | H | 576 |

EXAMPLE 17

Preparation of Compound No. 15

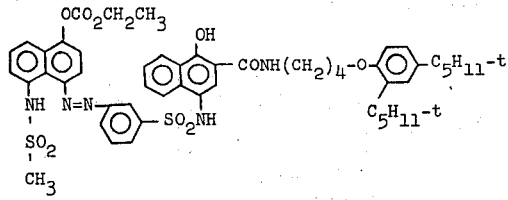

The above Compound 15 was prepared in a manner similar to Example 15 only using N-[5-ethoxycarbonyloxy-6-(m-chlorosulfonylphenylazo)-1-naphthyl]-methanesulfamide which was prepared from the 5-hydroxy counterpart (made as in Example 15) by reaction with ethyl chloroformate. Compound 15 was tested as in Example 15 and found to have a λ max in the coating of 440 nm and a λ max of transferred dye of 555 nm and densities of 1.87 (30 seconds), 2.5 (60 seconds) and 2.6 (120 seconds).

EXAMPLE 18

An integral multicolor photosensitive element is prepared by coating the following layers in the order recited on a transparent cellulose acetate film support:

1. image-receiving layer of copoly[styrene-N-benzyl-N,N-dimethyl-N-(3-maleimidopropyl)ammonium chloride] (200 mg./ft.$^2$) and gelatin (100 mg./ft.$^2$);
2. reflecting layer of titanium dioxide (2000 mg./ft.$^2$) and gelatin (200 mg./ft.$^2$);
3. opaque layer of carbon black (250 mg./ft.$^2$) and gelatin (312 mg./ft.$^2$);
4. cyan image dye-providing compound (65 mg./ft.$^2$) having the formula

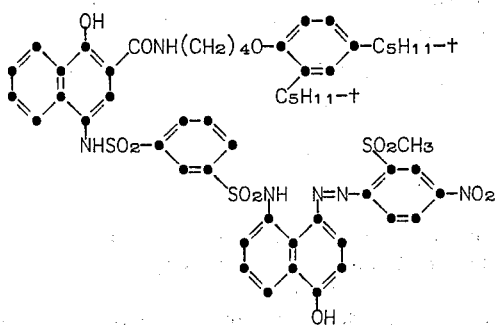

and gelatin (100 mg./ft.$^2$);

5. red-sensitive, internal-image gelatin-silver chlorobromide emulsion (100 mg. gelatin/ft.$^2$ and 125 mg. silver/ft.$^2$), 2,5-di-sec-dodecylhydroquinone (25 mg./ft.$^2$) and nucleating agent formyl-4-methylphenylhydrazine (1 g./mole of silver);
6. interlayer of gelatin (100 mg./ft.$^2$) and 2,5-di-sec-dodecylhydroquinone (50 mg./ft.$^2$);
7. magenta image dye-providing Compound No. 14 (95 mg./ft.$^2$) prepared in Example 15, and gelatin (175 mg./ft.$^2$);
8. green-sensitive, internal-image gelatin-silver chlorobromide emulsion (125 mg. gelatin/ft.$^2$ and 150 mg. silver/ft.$^2$), 2,5,di-sec-dodecylhydroquinone (50 mg./ft.$^2$) and nucleating agent formyl-4-methylphenylhydrazine (1 g./mole of silver);
9. interlayer of gelatin (100 mg./ft.$^2$) and 2,5-di-sec-dodecylhydroquinone (50 mg./ft.$^2$);
10. yellow image dye-providing compound (100 mg./ft.$^2$) having the formula

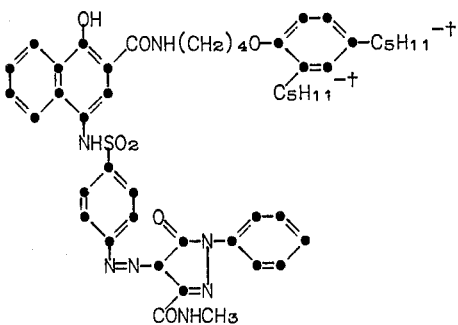

and gelatin (150 mg./ft.$^2$);

11. blue-sensitive internal-image gelatin-silver chlorobromide emulsion (100 mg. gelatin/ft.$^2$ and 150 mg. silver/ft.$^2$), 2,5-di-sec-dodecylhydroquinone (50 mg./ft.$^2$) and nucleating agent formyl-4-methylphenylhydrazine (1 g./mole of silver); and
12. overcoat of gelatin (82.5 mg./ft.$^2$).

The above silver halide emulsions are direct-positive emulsions having high internal sensitivity and low surface sensitivity of the type described in U.S. Pat. No. 2,592,250.

The above-prepared photosensitive element is then exposed to a graduated-density multicolor test object. The following processing composition is employed in a pod and is spread between the photosensitive element and an opaque cellulose acetate sheet by passing the transfer "sandwich" between a pair of juxtaposed pressure rollers:

| | | |
|---|---|---|
| sodium hydroxide | 40 | g. |
| 4-hydroxymethyl-4-methyl-1-phenyl-3-pyrazolidone | 4 | g. |
| 5-methylbenzyltriazole | 0.1 | g. |
| potassium iodide | 0.01 | g. |
| hydroxyethyl cellulose | 25 | g. |
| distilled water to | 1000 | ml. |

After 4 minutes, the element is separated from the opaque sheet, subjected to a 1-minute acid rinse, fixed for 4 minutes, washed and dried. The following sensitometric results are obtained.

| Maximum Density | | | Minimum Density | | |
|---|---|---|---|---|---|
| Red | Green | Blue | Red | Green | Blue |
| 1.26 | 1.60 | 2.52 | 0.48 | 0.48 | 0.54 |

The yellow image dye-providing compound used in this example is prepared as follows:

To a solution of 7.3 g. (0.015 mole) of 1-hydroxy-4-amino-N-[Δ-(2,4-di-t-amylphenoxy)butyl]-2-naphthamide in 60 ml. of dry pyridine cooled to 2°C. in an ice bath and stirred in a nitrogen atmosphere are added 6.4 g. (0.016 mole) of 1-phenyl-3-methylcarbamyl-4-(p-chlorosulfonylphenylazo)-5-pyrazolone. The mixture is stirred for 2 hours at room temperature and poured into 1 liter of ice and water containing 75 ml. of hydrochloric acid. The precipitate is collected, dried and recrystallized to give 10.4 g. of the yellow image dye-providing compound.

The photographic elements of this invention can be processed to provide a good positive image in the exposed element by a reversal process. The following example employs an image dye-providing compound adapted for use in the reactions claimed in Hinshaw et al., U.S. Ser. No. 326,628.

EXAMPLE 19

An image dye-providing Compound 22 of the following structure is prepared in a manner similar to the methods described in Hinshaw et al, U.S. Ser. No. 326,628.

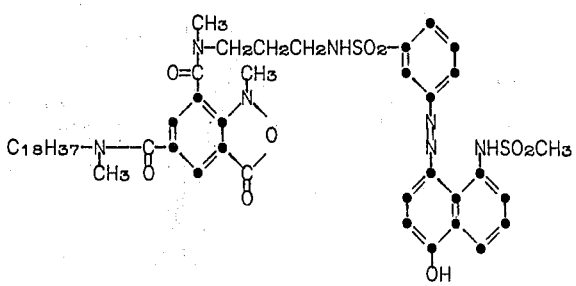

A photographic element is prepared by coating the layers on the support as follows:

1. support;
2. layer containing 40 mg./ft.² of the above compound dissolved in 20 mg./ft.² of diethyl lauramide, 10 g./ft.² of 5-(2-cyanoethylthio)-1-phenyltetrazole dissolved in 30 mg./ft.² of tricresyl phosphate, and gelatin at 125 mg./ft.²;
3. layer containing a negative silver bromoiodide emulsion coated at 100 mg./ft.² based on silver and gelatin at 100 mg./ft.²;
4. layer containing gelatin at 50 mg./ft.².

A sample of the photographic element is exposed imagewise to a step wedge and processed in Kodak Developer DK-50 at a pH of 9.0 for 15 minutes at 20°C. The element is then washed for 5 minutes, dried, and exposed to room light. The sample is then brought into interfacial contact with an image-receiving element containing a dye mordant with a viscous processing solution inserted between the photographic element and the image-receiving element. The viscous processing solution has the formula:

| | |
|---|---|
| potassium hydroxide | 60 g. |
| hydroxyethyl cellulose | 30 g. |
| 4-hydroxymethyl-4-methyl-1-phenyl-3-pyrazolidone | 3 g. |
| sodium thiosulfate | 3 g. |
| potassium bromide | 10 g. |
| water to 1 liter | |

After 10 minutes the elements are separated. The receiver is washed and dried to provide a good negative image. The photosensitive element is washed, bleached, washed, fixed, washed and dried. A good positive cyan dye image is obtained in this element.

The invention has been described in detail with particular reference to certain preferred embodiments thereof, but it will be understood that variations and modifications can be effected within the spirit and scope of the invention.

We claim:
1. A magenta image dye-providing compound having a formula as follows:

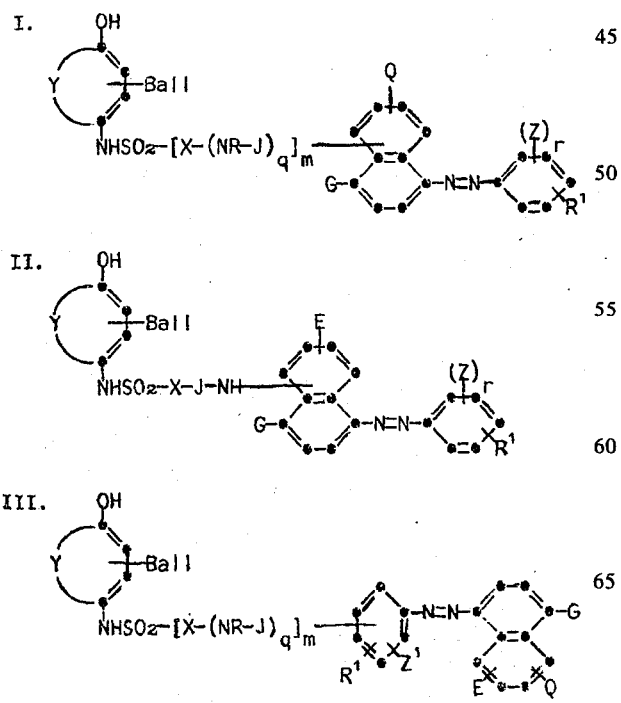

wherein
Ball represents an organic ballasting group containing at least 8 carbon atoms which renders said compound nondiffusible in a photographic element during development in an alkaline processing composition.

Y represents the carbon atoms necessary to complete a benzene or naphthalene nucleus;

$m$ and $q$ each represent an integer having a value of 0 or 1;

X represents $-R^2-L_n-R^2p-$ where each $R^2$ can be the same or different and each represents alkylene having 1 to 8 carbon atoms; phenylene; or phenylene substituted with chloro, bromo, cyano, nitro, methoxy, methyl, carboxy or sulfo; L represents oxy, carbonyl, carboxamido, carbamoyl, sulfonamido, sulfamoyl, sulfinyl or sulfonyl; n is an integer having a value of 0 or 1; $p$ is 1 when $n$ equals 1 and $p$ is 1 or 0 when $n$ equals 0 or when $q$ is 0, L is sulfonyl and $n$ is 1, then $p$ is 0, provided that when $p$ is 1 the carbon content of the sum of both $R^2$ radicals does not exceed 14 carbon atoms;

R represents hydrogen, or alkyl having 'to 6 carbon atoms;

J represents sulfonyl or carbonyl;

Q represents hydrogen, hydroxy or $-NHCOR^3$ or $-NHSO_2R^3$ wherein $R^3$ is alkyl having 1 to 6 carbon atoms, alkyl having 1 to 4 carbon atoms substituted with hydroxy, cyano, sulfamoyl, carboxy, or sulfo; benzyl, phenyl or phenyl substituted with carboxy, chloro, methyl, methoxy or sulfamoyl;

G represents hydroxy, an alkali metal salt thereof, a photographically inactive amine salt thereof or hydrolyzable acyloxy group having the formula

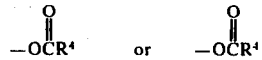

wherein $R^4$ is alkyl having 1 to about 18 carbon atoms, phenyl or phenyl substituted with chloro or nitro having 6 to 18 carbon atoms;

r represents an integer having a value of 1 or 2;

Z represents cyano, trifluoromethyl, carboxy, $-COOR^4$ wherein $R^4$ is as described previously, nitro in the 2- or 3- position relative to the azo linkage, fluorosulfonyl, sulfo, chloro, bromo, fluoro, alkylsulfonyl having 1 to 8 carbon atoms, alkylsulfonyl having 1 to 6 carbon atoms substituted with hydroxy, phenyl, cyano, sulfamoyl, carboxy or sulfo; phenylsulfonyl or phenylsulfonyl substituted wiht hydroxy, sulfamoyl, fluorosulfonyl, carboxy or sulfo; alkylcarbonyl having 2 to 5 carbon atoms, $-SO_2NR^5R^6$ wherein $R^5$ and $R^6$ are the same or different and each represent hydrogen, alkyl having 1 to 6 carbon atoms, alkyl having 1 to 4 carbon atoms substituted with hydroxy, cyano, sulfamoyl, carboxy or sulfo; benzyl, phenyl, phenyl substituted with hydroxy, sulfamoyl, sulfonyl, carboxy or sulfo; alkylcarbonyl having 2 to 7 carbon atoms, phenylcarbonyl, alkylsulfonyl having 1 to 6 carbon atoms, phenylsulfonyl, or $R^5$ and $R^6$ taken together represent $=CH-N(CH_3)_2$; $-CON(R^5)_2$ wherein each $R^5$ can be the same or different and is as described previously; and, in Formulas I or II when r is 1, Z represent

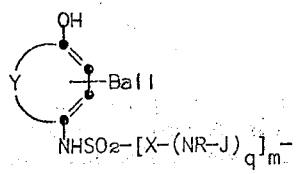

wherein Y, Ball, X, J, R, q and m are as described previously;

$R^1$ represents hydrogen, alkyl having 1 to 4 carbon atoms, alkoxy having 1 to 4 carbon atoms, chlooro, bromo or fluoro;

E is in the 5-, 6- or 7-position relative to G and represents hydrogen, carboxy, —COOR$^4$ wherein R$^4$ is as described previously, sulfo, —SO$_2$NR$^5$R$^6$, —CON(R$^5$)$_2$ wherein R$^5$ and R$^6$ are as described previously, alkylsulfonyl having 1 to 8 carbon atoms, alkylsulfonyl having 1 to 8 carbon atoms substituted with cyano, hydroxy, sulfamoyl, phenyl or sulfo; phenylsulfonyl or phenylsulfonyl substituted with sulfo, carboxy, fluorosulfonyl or methoxy;

$Z^1$ represents hydrogen or Z;

with the proviso that there be no more than one carboxy present in said compound.

2. A compound as described in claim 1 wherein n and p each have a value of 0.

3. A compound as described in claim 1 wherein m has a value of 0.

4. A compound as described in claim 1 wherein G is hydroxy.

5. A compound as described in claim 1 wherein the

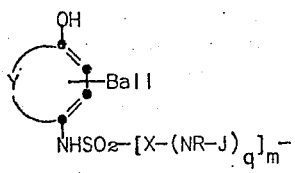

substituent in Formula I is in the 5- or 6- position relative to C; the

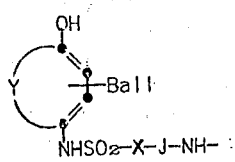

substituent in Formula II is in the 5- or 8- position relative to G; and the

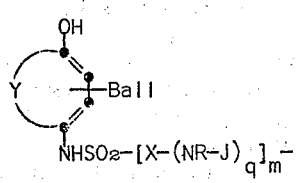

substituent in Formula III is in the 2-, 3- or 4- position relative to the azo linkage;

$R^2$ represents alkylene having 1 to 4 carbon atoms, phenylene or phenylene substituted with carboxy, chloro, methyl or methoxy;

L represents sulfamoyl, sulfonamido, carbamoyl or carboxamido;

R represents hydrogen;

q is an integer having a value of 1;

m is an integer having a value of 0 or 1;

Q represents hydrogen, hydroxy, —NHCOR$^3$ or —NHSO$_2$R$^3$ wherein R$^3$ represents alkyl having 1 to 4 carbon atoms; alkyl having 1 to 4 carbon atoms substituted with hydroxy, cyano, sulfamoyl, carboxy or sulfo; benzyl, phenyl or phenyl substituted with carboxy, chloro, methyl, methoxy or sulfamaoyl;

G represents hydroxy or a hydrolyzable acyloxy group having the formula:

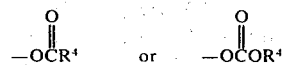

wherein R$^4$ is alkyl having 1 to 18 carbon atoms, phenyl or phenyl substituted with chloro or nitro;

r is an integer having a value of 1;

Z represents cyano, trifluoromethyl, chloro, fluoro, bromo, alkylsulfonyl having 1 to 6 carbon atoms, alkylsulfonyl having 1 to 6 carbon atoms substituted with hydroxy, phenyl, cyano, sulfamoyl, carboxy or sulfo; phenylsulfonyl; phenylsulfonyl substituted with hydroxy, sulfamoyl, fluorosulfonyl, carboxy or sulfo; —SO$_2$NHR$^6$ wherein R$^6$ is hydrogen, alkyl having 1 to 4 carbon atoms, or alkyl having 1 to 4 carbon atoms substituted with hydroxy, cyano, sulfamoyl, carboxy or sulfo; benzyl, phenyl or phenyl substituted with hydroxy, sulfonyl, sulfamoyl, carboxy or sulfo;

$R^1$ represents hydrogen, alkyl having 1 to 4 carbon atoms, alkoxy having 1 to 4 carbon atoms, chloro, bromo or fluoro;

E represents hydrogen or —SO$_2$NHR$^6$ wherein R$^6$ is hydrogen, alkyl of 1 to 4 carbon atoms; alkyl having 1 to 6 carbon atoms substituted with hydroxy, cyano, sulfamoyl, carboxy, or sulfo; benzyl, phenyl or phenyl substituted with hydroxy, sulfamoyl, carboxy or sulfo; and $Z^1$ represents hydrogen, methylsulfonyl, cyano or sulfamoyl.

6. A compound as described in claim 5 wherein n and p each have a value of 0.

7. A compound as described in claim 5 wherein m has a value of 0.

8. A compound as described in claim 5 wherein G is hydroxy.

9. A compound as described in claim 5 having the formula

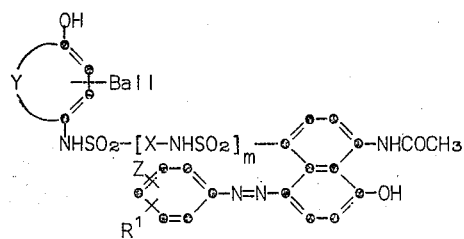

wherein

Y represents the atoms necessary to complete a naphthalene nucleus;

X represents

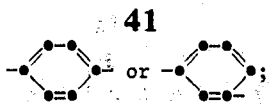

Z represents cyano, a sulfamoyl radical having the formula —SO$_2$NHR$^6$ wherein R$^6$ is hydrogen, alkyl having 1 to 4 carbon atoms; or alkylsulfonyl having 1 to 4 carbon atoms; and R$^1$ represents hydrogen or chloro.

10. A compound as described in claim 9 wherein -Ball is linked to the sulfonamidonaphthol nucleus through a bivalent

or —SO$_2$NH— moiety; X represent

Z represents cyano, —SO$_2$NH$_2$ or —SO$_2$CH$_3$; and R$^1$ represents hydrogen or chloro.

11. A compound as described in claim 10 wherein -Ball represents

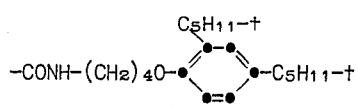

and is in the 2-position relative to the hydroxy group.

12. A compound as described in claim 5 having the formula

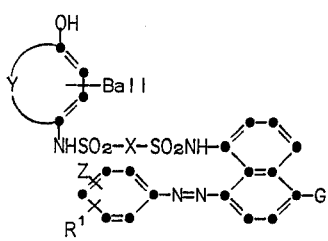

wherein

Y represents the atoms necessary to complete a naphthalene nucleus;

X represents

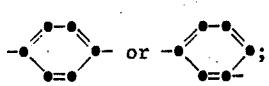

G represents hydroxy, a photographically inactive ammonium salt thereof, or a hydrolyzable acyloxy group having the formula:

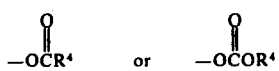

wherein R$^4$ is alkyl having 1 to 18 carbon atoms, phenyl or phenyl substituted with chloro or nitro;

Z represents cyano, a sulfamoyl radical having the formula —SO$_2$NHR$^6$ wherein R$^6$ is hydrogen alkyl having 1 to 4 carbon atoms; or alkylsulfonyl having 1 to 4 carbon atoms; and R$^1$ represents hydrogen or chloro.

13. A compound as described in claim 12 wherein -Ball is linked to the sulfonamidonaphthol nucleus through a bivalent

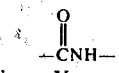

or —SO$_2$NH— moiety; X represents

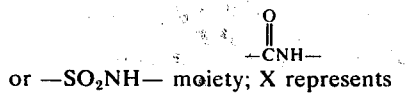

G represents hydroxy; Z represents cyano, —SO$_2$NH$_2$ or —SO$_2$CH$_3$; and R$^1$ represents hydrogen or chloro.

14. A compound as described in claim 13 wherein -Ball represents

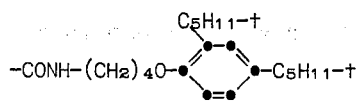

and is in the 2-position relative to the hydroxy group.

15. A compound as described in claim 5 having the formula

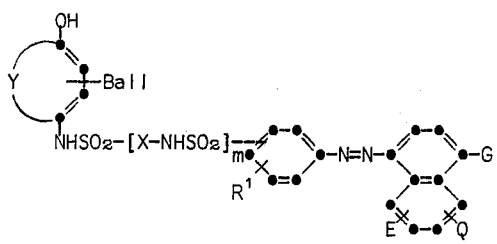

Y represents the atoms necessary to complete a naphthalene nucleus;

Q is in the 5- position relative to G and represents hydrogen or —NHSO$_2$R$^3$; or Q is in the 8- position relative to G and represents —NHCOCH$_3$;

G represents hydroxy, a photographically inactive ammonium salt thereof, or a hydrolyzable acyloxy group having the formula:

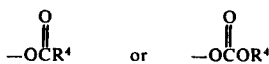

wherein R$^4$ is alkyl having 1 to 18 carbon atoms, phenyl or phenyl substituted with chloro or nitro;

R$^1$ represents hydrogen or chloro; and

E represents hydrogen or, when Q is —NHCOCH$_3$, E is in the 5- position relative to G and represents —SO$_2$NH$_2$.

16. A compound as described in claim 15 wherein -BAll is linked to the sulfonamidonaphthol nucleus through a bivalent

or —SO$_2$NH— moiety; Q represents hydrogen, —NHSO$_2$CH$_3$ or —NHCOCH$_3$; and G represents hydroxy.

17. A compound as described in claim 16 wherein -Ball represents

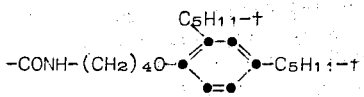

and is in the 2-position relative to the hydroxy group.

18. A compound as described in claim 10 wherein -Ball represents

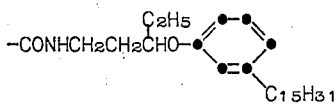

and is in the 2-position relative to the hydroxy group.

19. A compound as described in claim 13 wherein -Ball represents

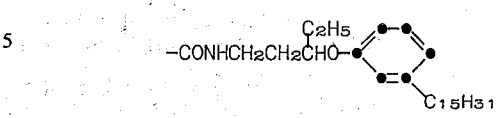

and is in the 2-position relative to the hydroxy group.

20. A compound as described in claim 16 wherein -Ball represents

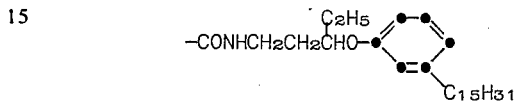

and is in the 2-position relative to the hydroxy group.

* * * * *